US012469902B2

(12) United States Patent
Brown et al.

(10) Patent No.: US 12,469,902 B2
(45) Date of Patent: Nov. 11, 2025

(54) SYSTEMS AND METHODS FOR HEATING ELECTROCHEMICAL SYSTEMS

(71) Applicant: Ampcera Inc., Milpitas, CA (US)

(72) Inventors: James Emery Brown, Tucson, AZ (US); Hui Du, Tucson, AZ (US); Chen Chen, Tucson, AZ (US); Sumin Zhu, San Francisco, CA (US)

(73) Assignee: Ampcera Inc., Tucson, AZ (US)

( * ) Notice: Subject to any disclaimer, the term of this patent is extended or adjusted under 35 U.S.C. 154(b) by 0 days.

(21) Appl. No.: 18/441,225

(22) Filed: Feb. 14, 2024

(65) Prior Publication Data

US 2024/0186620 A1 Jun. 6, 2024

Related U.S. Application Data

(63) Continuation of application No. 17/374,547, filed on Jul. 13, 2021, now Pat. No. 11,936,028.

(60) Provisional application No. 63/051,051, filed on Jul. 13, 2020.

(51) Int. Cl.
H01M 10/657 (2014.01)
H01M 10/615 (2014.01)
H01M 50/454 (2021.01)

(52) U.S. Cl.
CPC ....... *H01M 10/657* (2015.04); *H01M 10/615* (2015.04); *H01M 50/454* (2021.01); *H01M 2220/20* (2013.01)

(58) Field of Classification Search
CPC . H01M 50/454; H01M 10/657; H01M 10/615
See application file for complete search history.

(56) References Cited

U.S. PATENT DOCUMENTS

| 732,616 A | 6/1903 | Burgess et al. |
| 1,687,196 A | 10/1928 | Daellenbach |
| 2,418,792 A | 4/1947 | Coleman |
| 2,442,380 A | 6/1948 | Schrodt |
| 2,516,048 A | 7/1950 | Endress |
| 2,615,933 A | 10/1952 | Carlson |
| 2,626,971 A | 1/1953 | Percival |
| 2,700,064 A | 1/1955 | Akerman |
| 2,710,937 A | 6/1955 | Godshalk |
| 2,761,006 A | 8/1956 | Kramer |
| 2,938,066 A | 5/1960 | Helmut |
| 3,623,471 A | 11/1971 | Bogue |
| 3,723,187 A | 3/1973 | Toydoka |
| 3,774,589 A | 11/1973 | Kober |
| 4,025,861 A | 5/1977 | Godard |
| 4,095,938 A | 6/1978 | Mikaila |

(Continued)

FOREIGN PATENT DOCUMENTS

| CN | 104916848 A | 9/2015 |
| DE | 102007052147 A1 | 5/2009 |

(Continued)

OTHER PUBLICATIONS

U.S. Appl. No. 10/084,201, filed Sep. 25, 2018, Kazuhito Hatta.

(Continued)

*Primary Examiner* — Karie O'Neill Apicella
(74) *Attorney, Agent, or Firm* — Walters & Wasylyna LLC

(57) ABSTRACT

An electrochemical system includes: an anode; a cathode; an electrolyte; and at least one dielectrically heatable material.

20 Claims, 15 Drawing Sheets

(56) References Cited

U.S. PATENT DOCUMENTS

| | | | |
|---|---|---|---|
| 5,039,927 | A | 8/1991 | Centafanti |
| 5,281,792 | A | 1/1994 | Lee |
| 5,362,942 | A | 11/1994 | Vanderslice, Jr. |
| 5,378,879 | A | 1/1995 | Monovoukas |
| 5,599,636 | A | 2/1997 | Braun |
| 5,948,298 | A | 9/1999 | Ijaz |
| 6,002,240 | A | 12/1999 | McMahan |
| 6,096,456 | A | 8/2000 | Takeuchi |
| 6,392,388 | B1 | 5/2002 | Young |
| 6,575,156 | B2 | 6/2003 | MacFarlane |
| 6,882,061 | B1 | 4/2005 | Ashtiani |
| 7,264,902 | B2 | 9/2007 | Horie |
| 7,947,925 | B2 | 5/2011 | Suzuki |
| 8,574,738 | B2 | 11/2013 | Fattig |
| 8,791,397 | B2 | 7/2014 | Kim |
| 8,852,772 | B2 | 10/2014 | McDonald |
| 9,083,065 | B2 | 7/2015 | Carkner |
| 9,214,703 | B2 | 12/2015 | Ikeda |
| 9,337,671 | B2 | 5/2016 | Komori |
| 12,057,561 | B1 * | 8/2024 | Du .................... H01M 10/0565 |
| 2004/0241520 | A1 | 12/2004 | Ha |
| 2008/0292964 | A1 | 11/2008 | Kazacos |
| 2009/0087723 | A1 | 4/2009 | Inda |
| 2011/0059343 | A1 | 3/2011 | McKinney |
| 2011/0305941 | A1 | 12/2011 | Park |
| 2012/0107665 | A1 | 5/2012 | Abe |
| 2013/0162258 | A1 * | 6/2013 | Patin ...................... G01R 27/02 324/426 |
| 2014/0076876 | A1 | 3/2014 | Papajewski |
| 2014/0113166 | A1 | 4/2014 | Schneider |
| 2015/0037698 | A1 | 2/2015 | Buzon et al. |
| 2016/0059733 | A1 | 3/2016 | Hettrich |
| 2016/0200011 | A1 | 7/2016 | Rothfuss |
| 2016/0204408 | A1 | 7/2016 | Herle |
| 2017/0085107 | A1 | 3/2017 | Rastegar |
| 2018/0108956 | A1 | 4/2018 | Fortenbacher |
| 2019/0074559 | A1 | 3/2019 | Demund |
| 2019/0081371 | A1 | 3/2019 | Bauer |
| 2019/0386357 | A1 | 12/2019 | McHugh |
| 2020/0176835 | A1 | 6/2020 | Rastegar |
| 2020/0212401 | A1 | 7/2020 | Huang |
| 2020/0303729 | A1 | 9/2020 | Kim |
| 2021/0175537 | A1 | 6/2021 | Shin |

FOREIGN PATENT DOCUMENTS

| | | |
|---|---|---|
| DE | 102008015621 A1 | 10/2009 |
| DE | 102011002729 A1 | 7/2012 |
| DE | 102011108196 A1 | 1/2013 |
| DE | 102012210091 A1 | 12/2013 |
| DE | 102012210146 A1 | 12/2013 |
| DE | 102013221747 A1 | 4/2015 |
| DE | 102013021255 A1 | 6/2015 |
| DE | 102016208064 A1 | 11/2017 |
| DE | 102016213159 A1 | 1/2018 |
| DE | 102016214337 A1 | 2/2018 |
| DE | 102017212275 A1 | 1/2019 |
| DE | 102017130559 A1 | 6/2019 |
| DE | 102018210417 A1 | 1/2020 |
| DE | 102018123910 A1 | 4/2020 |
| DE | 102019214648 A1 | 3/2021 |
| EP | 2827427 A1 | 1/2015 |
| JP | 2003197277 A | 7/2003 |
| JP | 2004178950 A | 6/2004 |
| JP | 2007227209 A | 9/2007 |
| JP | 4139199 B2 | 8/2008 |
| JP | 2010160932 A | 7/2010 |
| JP | 2013149414 A | 8/2013 |
| JP | 5649594 B2 | 1/2015 |
| JP | 6361322 B2 | 7/2018 |
| JP | 6455538 B2 | 1/2019 |
| JP | 6463570 B1 | 2/2019 |
| KR | 20110020666 A | 3/2011 |
| KR | 20130130292 A | 12/2013 |
| KR | 20150037242 A | 4/2015 |
| KR | 101721916 B1 | 3/2017 |
| KR | 101793311 B1 | 11/2017 |
| KR | 101816948 B1 | 1/2018 |
| KR | 102016122 B1 | 10/2019 |
| KR | 102042755 B1 | 11/2019 |

OTHER PUBLICATIONS

U.S. Appl. No. 10/147,950, filed Dec. 4, 2018, Avery Sakshaug.

U.S. Appl. No. 10/181,599, filed Jan. 15, 2019, Chad Allison.

U.S. Appl. No. 10/340,504, filed Jul. 2, 2019, Peter Englert.

Anthoney J. Bur, Dielectric properties of polymers at microwave frequencies: a review, Polymer vol. 26, No. 7, 1985, p. 963-977.

Sophie Laurent et al., Superparamagnetic iron oxide nanoparticles: promises for diagnosis and treatment of cancer, International Journal of Molecular Epidemiology and Genetics, 2011; vol. 2, No. 4, p. 367-390.

Stanley Zinn, Coil design and fabrication: Basic Design and Modifications, Oct. 1988, vol. 20, Issue 6, United States.

Thomas Bayerl, Induction Heating of Thermoplastic Materials by Particulate Heating Promoters, Polymers & Polymer Composites, vol. 20, No. 4, 2012, p. 333-341.

Xiao-Guang Yang et al., Fast charging of lithium-ion batteries at all temperatures, PNAS, Jul. 10, 2018.

Xiao-Guang Yang, Asymmetric Temperature Modulation for Extreme Fast Charging of Lithium-Ion Batteries, Joule vol. 3, No. 12, 2019, p. 3002-3019.

Yi Zhang et al., Magnetic Induction Heating of Nano-sized Ferrite Particles, Advances in Induction and Microwave Heating of Mineral and Organic Materials, 2011, p. 484-500, Chapter 21, edited by Stanislaw Grundas.

* cited by examiner

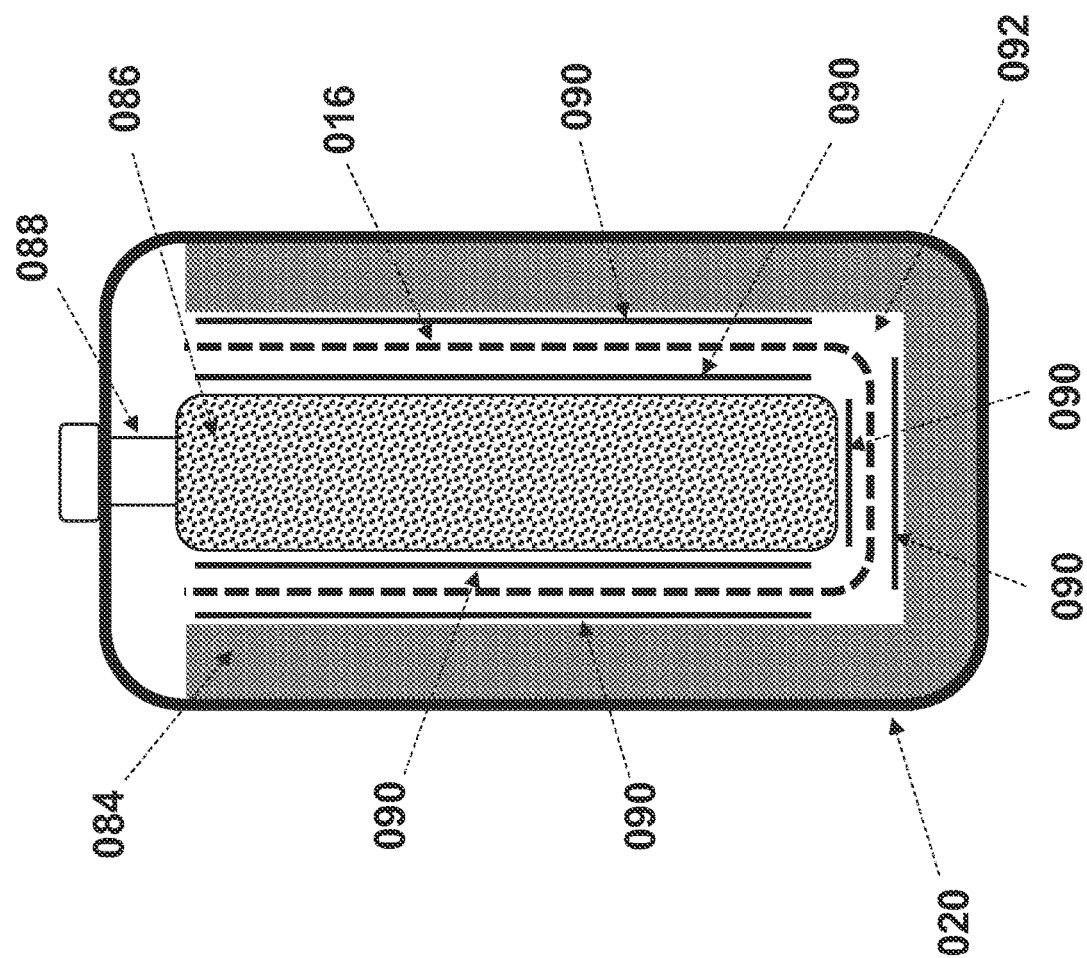
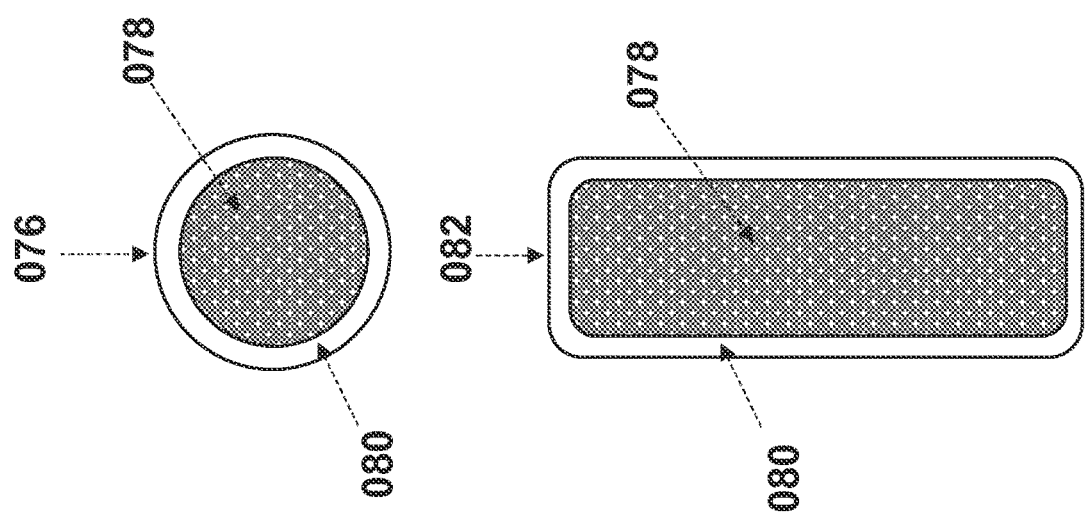
Fig. 6

SYSTEMS AND METHODS FOR HEATING ELECTROCHEMICAL SYSTEMS

PRIORITY

This application is a continuation of U.S. Ser. No. 17/374,547 filed on Jul. 13, 2021, which claims priority from U.S. Ser. No. 63/051,051 filed Jul. 13, 2020. The entire contents of U.S. Ser. No. 17/374,547 and U.S. Ser. No. 63/051,051 are incorporated herein by reference.

FIELD

This invention relates to systems and methods for the dielectric heating of electrolytes in electrochemical systems, and, in particular, to systems and methods for the dielectric heating of electrolytes in electrochemical cells for operation in cold weather.

BACKGROUND

The electrolyte plays a critical role in electrochemical cells by providing an ionic conducting media positioned between the positive and negative electrodes. Depending on the nature of the electrochemical cell, the electrolytes may be in the form of a liquid, such as an organic or aqueous-based liquid, or a solid, such as a polymer, ceramic, or a ceramic-polymer composite, or in some instances a molten-state. During cell operation ions conduct or flow through the electrolyte media from one electrode to the other. In some instances, the ions conduct or flow in only one direction such as the case in primary batteries, zinc or aluminum air batteries, and fuel cells. In other instances, the ions may conduct or flow in both directions depending on whether it is a charge or discharge cycle. Rechargeable electrochemical cell technologies may include secondary batteries, lithium-air batteries, electrochemical capacitors, or flow batteries.

SUMMARY

In cold weather electrochemical cells often have poor efficiency, and in some cases stop functioning all together due to extreme cold. The poor efficiency, or stoppage, of the cells is a result of the low ionic conductivity of the electrolyte due to low temperatures. In essence the flow of ions is impeded or prohibited altogether. To avoid this the electrolyte must be heated to raise the temperature of the electrolyte and effectively the ionic conductivity of the electrolyte. An effective way to heat the electrolyte is through dielectric heating of dielectrically heatable materials, with a high dielectric loss or tangent loss ($\delta$) value, of at least $1 \times 10^{-5}$, in the frequency range of $10^3$ to $10^{12}$ Hz. The dielectrically heatable materials may include at least one dielectrically heatable materials embedded or suspended in the electrolyte, may include at least one dielectrically heatable layer in contact with the electrolyte, may include the electrolyte itself, or may include a component of the anode or the cathode. An electromagnetic wave may be applied to the positive or negative current collectors of an electrochemical cell through positive or negative terminals. An electromagnetic wave may induce a polarization change in the at least one dielectrically heatable material, causing rapid electron shift within the dielectrically heatable material, producing an alternating current within. The internal alternating current may generate heat, heating up the dielectrically heatable material, and thus heat the electrolyte. An electromagnetic wave may be generated using an electromagnetic generator inside a primary or secondary electric circuit, of an electrochemical system, exterior of the electrochemical cell. The electromagnetic wave frequency may be coupled with the dielectrically heatable material and applied to the current collectors of the electrochemical cell either continuous or pulsed at specified rates in order to control the internal temperature of the electrolyte.

In an embodiment, an electrochemical cell may include an energy storage device or system. Alternatively, an electrochemical cell may include an energy conversion device or system.

In an aspect, an energy storage device or system may include, for example, non-rechargeable primary batteries such as dry cells.

In another aspect, an energy storage device or system may include rechargeable or secondary batteries. Such battery systems may include wet cells, solid-state cells, or a hybrid/semi solid-state cell with minimal liquid, or in some instance in a molten state.

In yet another aspect an energy storage device or system may include electrochemical capacitors. Electrochemical capacitors may also be termed supercapacitors or ultracapacitors.

In yet another aspect, an energy storage device or system may include a flow battery system. Such flow systems may include, for example, redox flow, hybrid flow, or semi-solid flow, etc.

In yet another aspect, an energy conversion device or system may include a fuel cell. Such fuel cell systems may include, for example, proton exchange membrane (PEM), alkaline (AFC), solid oxide (SOFC), etc.

In another embodiment, the nature of electrolytes may include, for example, aqueous liquid, nonaqueous liquid such as organic or inorganic, polymer, gel polymer, solid-state ceramics, ceramic-polymer composites, molten-salt, or a combination thereof.

In yet another embodiment, materials with dielectric heating properties may be suspended or embedded within the electrolyte of the electrochemical cell.

In an aspect, materials with dielectric heating properties may be referred to in the art as those with a high dielectric loss or loss tangent ($\delta$) values of at least $1 \times 10^{-5}$ in a frequency range of $10^3$ to $10^{12}$ Hz.

In an aspect, materials with dielectric heating properties may include zero-dimensional or one-dimensional particles such as quantum dots, nanopowders, nanoparticles, micropowders, microparticles, irregular shapes, etc.

In another aspect, materials with dielectric heating properties may include one-dimensional or two-dimensional wires or fibers, such as nanofibers, nanorods, microfibers, microrods, etc.

In yet another aspect, materials with dielectric heating properties may include a mesh or foam structure used to support an electrolyte, wherein the electrolyte is a polymer, gel polymer, or ceramic-polymer composite electrolyte.

In yet another embodiment, dielectrically heatable materials may be deposited on, or embedded within, a battery separator. Such separators may include, for example, cellulosic, glass mats, polyolefin, polyethylene, polypropylene, etc.

In yet another embodiment, the embedded or suspended dielectrically heatable materials may be heated using an electromagnetic wave applied to the positive or negative current collector of an electrochemical cell through positive or negative terminals, respectively.

In an aspect, the electromagnetic wave may be generated using an electromagnetic wave generator positioned within the electrical circuit of the electrochemical system, exterior of the electrochemical cell.

In another aspect, the electromagnetic wave may be generated using an electromagnetic wave generator positioned within a secondary electrical circuit, within the electrochemical system, exterior of the electrochemical cell.

In yet another aspect, an electromagnetic wave may be applied in a pulsating fashion with controlled interment interruptions to control the internal temperature of the electrolyte.

In yet another aspect, an electromagnetic wave may be continuously applied without interruption when high temperatures are required for electrolyte performance.

BRIEF DESCRIPTION OF THE FIGURES

FIG. 6: A schematic illustration of dielectrically heatable wires or fibers embedded or suspended in the liquid electrolyte of a primary Zinc-Carbon battery.

DETAILED DESCRIPTION

Figure 1:
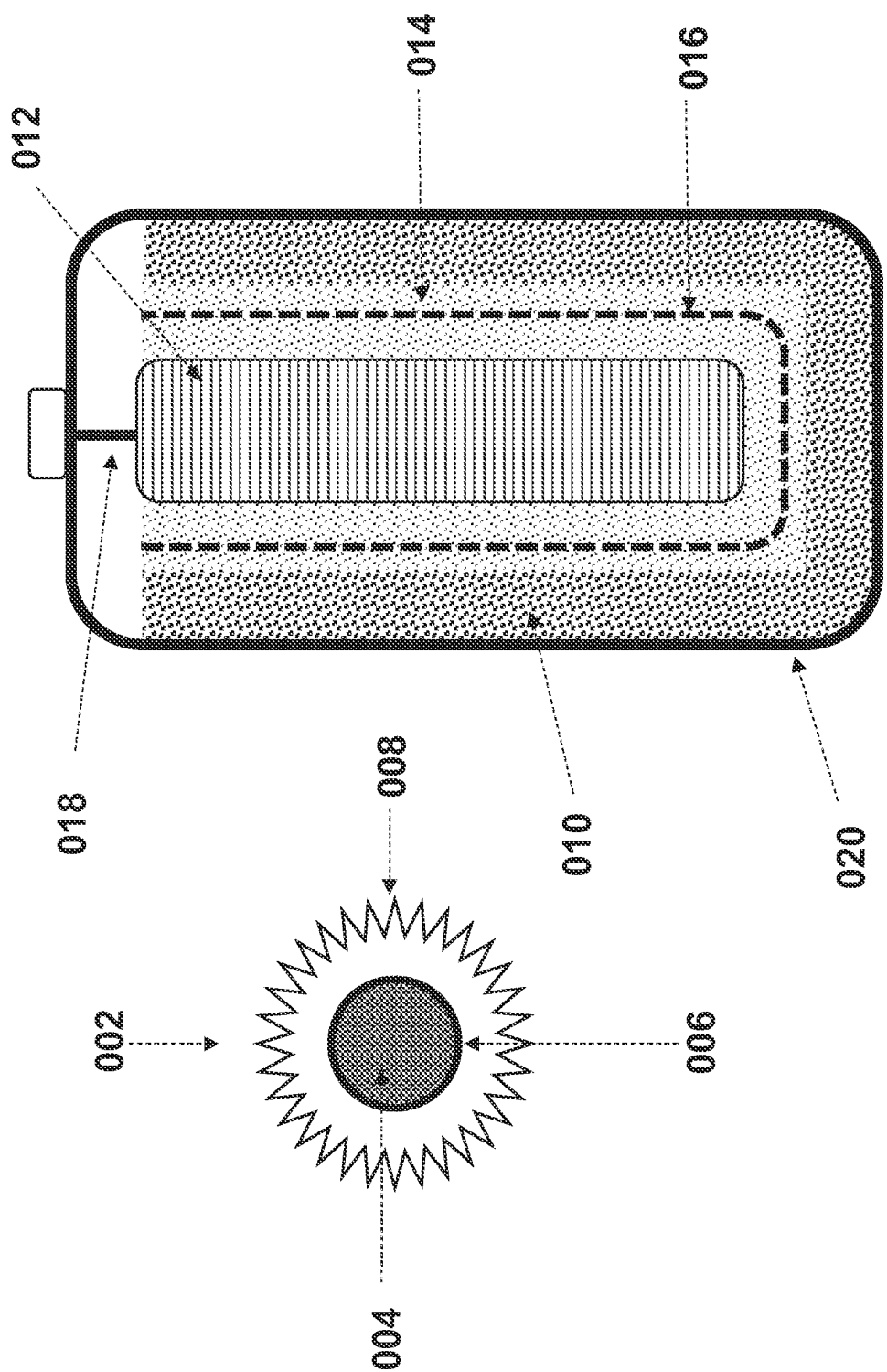
FIG. 1 A schematic illustration of dielectrically heatable materials suspended in the electrolyte of a primary Alkaline battery.

In cold weather the efficiency of electrochemical cells can be scientifically reduced, or in some cases ceased all together such as in the case of extreme cold. This is due to a reduction in the ionic conductivity of the electrolyte, or ion conducting media, or ion selective media, which can be in the form of a liquid, polymer, gel polymer, ceramic-polymer composite, or solid-state ceramic. Heating up the electrolyte and maintaining a sufficient internal temperature is key to electrochemical cell operation in cold weather. A method to do this may include the dielectric heating of dielectric or insulative materials, with high dielectric loss or tangent loss ($\delta$) values of at least $1 \times 10^{-5}$, in the frequency range of $10^3$ to $10^{12}$ Hz. Dielectrically heatable materials may range in size from nanoparticles to macro sized meshes. Dielectric heating may be used to heat up and maintain an internal electrolyte temperature, ranging from room temperature to 1000 degrees Celsius, depending on the type of electrochemical cell, to enhance performance in cold weather. A continuous or pulsed electromagnetic wave can be applied to the positive or negative current collectors of an electrochemical cell through the primary, or secondary, positive or negative terminals, respectively. The electromagnetic wave can in turn generate heat within the dielectrically heatable materials, heating the electrolyte. An electromagnetic wave may be generated using an electromagnetic wave generator positioned within a primary or secondary electrical circuit, within the electrochemical system, exterior of the electrochemical cell.

The present disclosure relates to types of electrochemical systems.

Electrochemical systems may include, for example, primary batteries, secondary batteries, electrochemical capacitors, flow batteries, fuel cells, etc.

The present description relates to primary batteries.

A primary battery may be defined as a non-rechargeable battery with only one discharged cycle.

Types of primary batteries may include, for example, alkaline batteries (or alkaline zinc-manganese dioxide), zinc-carbon batteries (or Leclanché cell), zinc chloride batteries (or heavy duty), silver-oxide batteries (or zinc-silver oxide), mercury batteries (or zinc-mercuric oxide), nickel oxyhydroxide batteries, magnesium batteries, lithium batteries (lithium carbon monofluoride, lithium iron disulfide, lithium-thionyl chloride, lithium manganese dioxide, lithium sulfide dioxide), aluminum-air, zinc-air, sugar batteries, paper batteries, organic radical battery, etc.

Alkaline or alkaline zinc-manganese dioxide batteries may be characterized as a dry cell primary battery with a zinc powder/gel negative electrode (anode) and manganese dioxide/carbon paste (positive electrode or cathode) coated on to the container, wherein an alkali metal hydroxide solution such as potassium hydroxide serves as the electrolyte.

Zinc-carbon (Lechanché or Standard Duty) batteries may be characterized as a dry cell primary battery with zinc serving as both the negative electrode (anode) and container and manganese dioxide as the positive electrode (cathode) on a carbon rod serving as the current collector, wherein an ammonium chloride solution serves as the electrolyte.

Zinc chloride (Heavy Duty, Super Heavy Duty, Extra Heavy Duty) batteries may be characterized as a dry cell primary battery with zinc serving as both the negative electrode (anode) and container and a manganese dioxide positive electrode (cathode) on a carbon rod serving as the current collector, wherein a zinc chloride solution serves as the electrolyte.

Silver-oxide or zinc-silver oxide batteries may be characterized as a dry cell primary battery with zinc or an amalgamated zinc gel as the negative electrode (anode) and a silver oxide paste as the positive electrode (cathode), wherein an alkali metal hydroxide solution such as potassium hydroxide or sodium hydroxide serves as the electrolyte. In some instances, the negative electrode may have a small percentage (≤1%) of mercury. In other instances, the positive electrode may be mixed with manganese dioxide.

Mercury or zinc-mercury oxide batteries may be characterized as a dry cell primary battery with a with zinc as the negative electrode (anode) and mercury oxide as the positive electrode (cathode), where an alkali metal hydroxide solution such as potassium hydroxide or sodium hydroxide serves as the electrolyte. In some instances, the manganese dioxide may be mixed into the positive electrode.

Nickel oxyhydroxide batteries may be characterized as a dry cell primary battery with zinc as the negative electrode (anode) and manganese dioxide mixed with nickel oxyhydroxide as the positive electrode (cathode), wherein an alkali metal hydroxide solution such as potassium hydroxide serves as the electrolyte.

Magnesium batteries may be characterized as a dry cell primary battery with magnesium as the negative electrode (anode) and silver chloride as the positive electrode (cathode) as in the case of the BA-4386, wherein the battery is activated with water to form a silver chloride electrolyte solution.

Lithium batteries may be characterized as a primary battery with lithium metal as the negative electrode (anode) and a variety of materials as the positive electrode (cathode). For instance, Lithium Carbon Monofluoride batteries use carbon monofluoride as the cathode. In another instance, Lithium Iron Disulfide batteries use iron disulfide as the cathode. In yet another instance, Lithium Manganese Dioxide batteries use manganese dioxide as the cathode. In yet another instance, Lithium Copper Oxide batteries use copper oxide as the cathode. These lithium batteries use an organic-based electrolyte such as lithium perchlorate or lithium tetrafluoroborate in propylene carbonate.

Another example of a primary lithium battery is the Lithium Thionyl Chloride battery which uses liquid thionyl chloride as the cathode and a non-aqueous inorganic electrolyte such as lithium tetrachloroaluminate dissolved in thionyl chloride. In some instances, bromide chloride may be added to the thionyl chloride cathode to increase voltage. Such batteries are typically used for cold weather environments, wherein dielectric heating is expected to only increase the temperature to a sufficient operating temperature in extreme cold environments.

Other primary lithium batteries may be specialized having a cathode composed of, for example, lithium silver chromate, lithium silver vanadium oxide, lithium lead bismuthate, lithium bismuth trioxide, lithium copper sulfide, lithium lead copper sulfide, lithium iodine, lithium sulfur dioxide, lithium sulfuryl chloride, etc.

Standard sizes of primary batteries may include, for example, cylindrical (D, C, AA, AAA, AAAA, etc.), button or coin cell (LR44, CR2032, CR2016, CR2025, BR2330, CR2330, LR1154, SR516, etc.), 4.5V multicell, 9V multicell, etc.

Zinc-air batteries are a primary metal-air battery ranging in size from a button cell to large scale for grid energy storage backup. Zinc-air batteries may contain a zinc anode and a porous cathode containing a catalyst, wherein an alkali metal hydroxide solution such as potassium hydroxide may serve as the electrolyte.

Aluminum-air batteries are a primary metal-air battery with an aluminum metal and a porous cathode containing a catalyst, wherein metal hydroxide solution such as potassium hydroxide may serve as the electrolyte. Alternatively, seawater may be used as an electrolyte in some instances. An exemplary cathode is composed of a nickel grid coated with a layer of carbon and a cobalt catalyst, all coated with a porous hydrophobic layer of polytetrafluoroethylene (PTFE).

The present description relates to secondary batteries.

A secondary battery may be defined as a battery that is rechargeable or not limited to one discharge cycle.

A secondary battery has an anode and cathode that are in electrical contact through an external electrical circuit but physically separated by an electrolyte, and in some instances a separating porous material.

Secondary batteries may be in the form of, for example, ion-based batteries, metal batteries, air-batteries, thin film batteries, or micro batteries.

Types of secondary ion-based batteries, or intercalation batteries, may include, for example, lithium ion batteries, lithium-ion polymer, sodium ion batteries, magnesium ion batteries, aluminum ion batteries, potassium ion batteries, zinc ion batteries, lithium titanate battery, etc.

A positive electrode cathode for an ion-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A negative electrode or anode for an ion-based secondary battery may include an active material such as, for example, graphite, titanate, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

Ion-based secondary batteries may be defined as a liquid battery with a liquid electrolyte, a polymer battery with a polymer or gel-polymer electrolyte, a solid-state battery with a solid-polymer, solid-state ceramic, or a composite electrolyte, or a combination thereof.

In the case of a liquid or polymer ion-based battery, the negative electrode may be coated with an artificial solid electrolyte interface layer.

In the case of a solid-state ion-based battery, the positive and negative electrodes may contain an ionic conductive media, or a mixture of one or more ionic conductive media, to facilitate ion transportation in said electrode.

In the case of a solid-state ion-based battery, the positive electrode and/or the negative electrode may be coated with a protective layer to enhance electrochemical stability at the electrode/electrolyte interface. Such layers are assumed to be composed of materials capable of ionic conduction. A protective coating may include, for example, lithium borate, lithium aluminate ($LiAlO_2$), lithium tungstate ($Li_2WO_4$), lithium niobium oxide ($LiNbO_3$), lithium phosphate ($Li_3PO_4$). lithium oxysulfide (LiAlSO, $Li_3PO_4$—$Li_2S$—$SiS_2$), lithium oxynitride (LiPON), etc.

Types of secondary metal-based batteries may include, for example, lithium metal batteries, sodium metal batteries, magnesium metal batteries, aluminum metal batteries, potassium metal batteries, zinc metal batteries.

A positive electrode cathode for a metal-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A negative electrode anode for a metal-based secondary battery may include, for example, a metal or metal-alloy interacting with ions through a plating and stripping mechanism. Such metal anodes may comprise of, for example, lithium metal, lithium metal alloy, sodium metal, sodium metal alloy, magnesium metal, magnesium metal alloy, aluminum metal, aluminum metal alloy, potassium metal, potassium metal alloy, zinc metal, zinc metal alloy. Alloying materials may include, for example, indium, manganese, etc.

Metal-based secondary batteries may be defined as a liquid battery with a liquid electrolyte provided that dendrite formation is prohibited, a polymer battery with a polymer or gel-polymer electrolyte provided that dendrite formation is prohibited, or a solid-state battery with a solid-polymer, solid-state ceramic, or a composite electrolyte, or a combination thereof.

In the case of a liquid or polymer metal-based battery, the negative electrode may be coated with an artificial solid electrolyte interface layer.

In the case of a solid-state metal-based battery, the positive electrode may contain an ionic conductive media, or a mixture of one or more ionic conductive media, to facility ion transportation in said electrode.

In the case of a solid-state metal-based battery, the positive electrode and/or the metal/metal alloy anode may be coated with a protective layer to reduce resistance at the active material/electrolyte interface. Such layers are assumed to be composed of materials capable of ionic conduction. A protective coating may include, for example, lithium borate, lithium aluminate ($LiAlO_2$), lithium tungstate ($Li_2WO_4$), lithium niobium oxide ($LiNbO_3$), lithium phosphate ($Li_3PO_4$), lithium oxysulfide (LiAlSO, $Li_3PO_4$—$Li_2S$—$SiS_2$), lithium oxynitride (LiPON), etc.

Types of secondary air-batteries may include, for example, lithium-air batteries, sodium-air batteries, potassium-air batteries, iron-air batteries, silicon-air batteries.

A secondary air-battery may contain metal, metal alloy, metal oxide as the negative electrode or anode. For example, a lithium-air battery may contain lithium metal or a lithium metal alloy. A sodium-air battery may contain sodium metal or sodium metal alloy. A potassium-air battery may contain potassium metal or a potassium metal alloy. A silicon-air battery may contain silicon metal, a silicon wafer, or a silicon alloy. An iron-air battery may contain iron metal or iron oxide anode.

A secondary air-battery anode may be coated with a thin layer to serve as, for example, an artificial solid electrolyte interface layer as a protective layer or a layer to reduce resistance at the electrode electrolyte interface where in the air-battery is composed of a solid-state electrolyte.

A secondary air-battery may contain a porous cathode structure to allow atmospheric oxygen to enter the system. The porous cathode may be composed of carbon such as a mesoporous carbon. Alternatively, the porous cathode may be a screen, grid, or foam material such as nickel foam, and coated with a carbon layer.

The secondary air-battery may contain a catalyst such as, for example, manganese, cobalt, ruthenium, platinum, silver, or a combination thereof. A catalyst may be deposited onto the carbon in the instance of a catalyst particle or oriented within the carbon structure as a dopant.

Alternatively, a secondary air-batteries may be devoid of a cathode structure where atmospheric oxygen acts as the cathode, as in the case of silicon-air batteries.

A secondary air-battery may contain an electrolyte with the nature or composition of, for example, aprotic, aqueous, mixed aqueous/aprotic, or solid-state.

Other types of secondary batteries may include, for example, lead acid battery, nickel cadmium battery, nickel-metal hydride battery, silver-zinc battery, nickel-iron battery, nickel-zinc battery, lithium-sulfur battery, rechargeable alkaline battery, glass battery or organic radical battery.

Lead acid batteries may be characterized as a secondary battery with a lead plate for negative electrode (anode) and lead oxide plate for the positive electrode (cathode) in the charged state, wherein aqueous sulfuric acid is the electrolyte. In the discharge state both plates may become lead sulfate. Such batteries may be in the form of a liquid cell, wherein a separate may be rubber, glass fiber, cellulose, or polyethylene, in the form of a gel which comprise of a silica gelling agent, or in the form of an absorbed glass mate (AGM) with limited sulfuric acid. The gel and AGM forms may be further classed as a maintenance free, sealed, and/or valve-regulated lead acid (VRLA).

Nickel cadmium batteries may be characterized as a secondary battery with metallic cadmium as the negative electrode (anode) and nickel oxide hydroxide as the positive electrode (cathode), wherein an alkali metal hydroxide solution such as potassium hydroxide may serve as the electrolyte. Nickel cadmium batteries may be sealed, as in the case of small compact cells, or vented as in the case for stand by emergency power backup or aviation purposes.

Nickel-metal hydride batteries may be characterized as a secondary battery with nickel oxide hydroxide as the positive electrode (cathode) and a hydrogen absorbing alloy as the negative electrode (anode), wherein an alkali metal hydroxide solution such as potassium hydroxide may serve as the electrolyte. A hydrogen absorbing alloy may be designated as an $AB_5$, where A is a mixture of lanthanum, cerium, neodymium, praseodymium, and B is nickel, cobalt, manganese, or aluminum, or an $AB_2$, where A is titanium or vanadium, and B is zirconium or nickel, modified with chromium, cobalt, iron, or manganese.

Silver-zinc batteries may be characterized as a secondary battery with metallic silver as the positive electrode (cathode) and a mixture of zinc oxide and pure zinc powders as the negative electrode (anode); wherein an alkali metal hydroxide solution such as potassium hydroxide may serve as the electrolyte.

Nickel-iron batteries may be characterized as a secondary battery with an iron plate as the negative electrode (anode) and nickel oxide hydroxide as the positive electrode (cathode), wherein an alkali metal hydroxide solution such as potassium hydroxide may serve as the electrolyte.

Nickel-zinc batteries may be characterized as a secondary battery with metallic zinc as the negative electrode (anode) and nickel oxide hydroxide as the positive electrode (cathode), wherein an alkali metal hydroxide solution such as potassium hydroxide may serve as the electrolyte.

Lithium-sulfur batteries may be characterized as a secondary battery with metallic lithium as the negative electrode (anode) and sulfur as the positive electrode (cathode); wherein a liquid organic solution composed of lithium salt and an ether, such as cyclic ether, short-chain ether, or glycol ether, or a combination thereof, serve as the electrolyte. Alternatively, the anode may be composed of carbon, lithiated carbon, or silicon. In some instance the sulfur cathode may be encapsulated within a carbon structure, or a structure of similar design, or coated with a polymer as to reduce or prevent the polysulfide shuttle effect.

Secondary batteries may also include molten-salt batteries such as, for example sodium-sulfur or sodium-nickel chloride (Zebra) batteries.

A sodium-sulfur (NaS) battery may be characterized as a secondary molten-salt battery with metallic sodium as the negative electrode (anode) and sulfur as the positive electrode (cathode); wherein both electrodes are typically in a liquid state during battery operation. An electrolyte for a NaS battery may include, for example, beta alumina ceramic solid electrolyte typically in tubular form. NaS batteries may have an operating temperature in the range of 225 to 350 degrees Celsius.

A sodium-nickel chloride (Na—$NiCl_2$) or Zebra battery may be characterized as a secondary molten-salt battery with metallic sodium as the negative electrode (anode) and nickel as the positive electrode (cathode); wherein the sodium is in liquid state during battery operation. An electrolyte for a Na—$NiCl_2$ battery may include, for example, molten sodium tetrachloroaluminate ($NaAlCl_4$), with ceramic beta alumina serving as a separator between $NaAlCl_4$ and molten sodium. Na—$NiCl_2$ batteries may have an operating temperature in the range of 225 to 350 degrees Celsius.

In secondary molten-salt batteries it is assumed that dielectrically heatable materials would be embedded in or on the surface of beta alumina, or an any other ceramic ionic conducting electrolyte. The dielectrically heatable materials may be used to soften or melt the components of the molten-salt battery, components as in those that are expected to be molten, in cold environments, or in some instances in ambient conditions when needed. The dielectrically heatable materials may be used to heat up the battery to, and maintain at, the desirable temperature range in cold environments, or in some instances in ambient conditions when needed.

In secondary molten-salt batteries the dielectrically heatable materials may be used to rapidly heat the battery to the desirable temperature range in cold environments, or in some instances in ambient conductions when needed. The dielectrically heatable materials may allow for the molten-salt batteries to remain in a nonmolten state when not in use, provided that the dielectrically heatable materials sufficiently heat or molt the components in a rapid manner.

The present description relates to electrochemical capacitors.

An electrochemical capacitor may also be referred to as a Supercapacitor or ultracapacitor.

An electrochemical capacitor may be classified as an electrochemical double layer capacitor or EDLC, pseudocapacitor, or hybrid capacitor also termed an asymmetrical capacitor, supercapattery, or supercabattery.

An electrochemical double layer capacitor may be characterized as an electrochemical capacitor that stores electrical charge electrostatically in the form of an electric double layer at the electrode/electrolyte interface. Electrodes in electrochemical double layer capacitors are generally composed of like carbon materials terming them symmetric capacitors. Electrodes are generally composed of high surface area active carbon coated onto metallic current collectors. Other carbon materials may include, for example, amorphous carbon, activated carbon fibers (ACFs), carbon fiber cloth (AFC), carbide-derived carbon (CDC), carbon aerogel, graphite, graphene, graphane, reduced graphene oxide (rGO), graphene oxide (GO), and carbon nanotubes (CNTs) such as single walled carbon nanotubes (SWCNTs), multiwalled carbon nanotubes (MWCNTs), or vertically aligned carbon nanofibers (VACNFs). Electrolytes in electrochemical double layer capacitors may include, for example, aqueous, organic, or ionic liquids.

A pseudocapacitor may be characterized as an electrochemical capacitor that stores electrical charge mainly through electrochemical pseudocapacitance, wherein electrochemical pseudocapacitance is a combination of reversible faradic charge-transfer between the electrolyte and electrode, intercalation, and electrosorption at the electrode surface and electrolyte interface. Electrodes in pseudocapacitor are generally composed of like materials with two or more valence states terming them symmetric capacitors. Electrode materials may be composed of either transition metal oxides or electrically conducting polymers (ECPs). Transition metal oxides may include, for example, ruthenium oxide, iridium oxide, manganese oxide, iron oxide, vanadium oxide, nickel oxide, or cobalt oxide. Polymers may include, for example, polyaniline, polythiophene, polypyrrole, polyacetylene, etc. Polymers may be n-doped and used as the negative electrode or p-doped and used as the positive electrode. Alternatively, sulfides may be used as an electrode in some instances, such as titanium sulfide. Electrode materials may be coated onto high surface area carbon materials to enhance the surface area. Electrolytes in pseudocapacitors may include, for example, aqueous, organic, or ionic liquids.

A hybrid capacitor may be characterized as an electrochemical capacitor with two electrodes of different materials, wherein one electrode (electrode 1) stores electrical charge through a double layer at the electrode/electrolyte interface, and the other electrode (electrode 2) stores electrical charge through electrochemical pseudocapacitance. Hybrid capacitors may also be termed asymmetrical capacitors, supercapattery, supercabattery, battery capacitors, or in specific circumstances lithium-ion capacitors. Electrode 1 is generally composed of high surface area active carbon (AC), or any other carbon material known in the art. Electrode 2 is generally composed of a transition metal oxide or an electrically conducting polymer (ECP) that may be n- or p-doped. Electrode 2 may be coated or anchored onto a high surface area carbon material to enhance surface area. In some instances, electrode 2 may also consist of a battery intercalation material known in the art. Electrolytes in hybrid capacitors may include, for example, aqueous, organic, or ionic liquids.

The present description relates to flow batteries.

A flow battery, also termed a redox flow battery, is a type of electrochemical cell where electrochemical energy is stored and provided by two electrochemical components dissolved in liquids termed a catholyte and analyte, which are contained within a system and separated by an ion-exchange or ion-selective or a ceramic ion-conducting membrane.

The catholyte and anolyte are stored in tanks and are pumped into the cell or cells of a reactor. A reactor cell consists of two chambers separated by an ion-exchange, ion-selective, or ceramic ion-conducting membrane, that are either cation or anion selective depending on the system. A chamber may consist of a current collect and porous electrode in which the catholyte or analyte flows past and flows through; wherein the electron transfer process takes place. Ions, either cationic or anionic depending on the system, are exchanged across the membrane. Alternatively, a reactor cell may consist of one chamber with a current collector and porous electrode in which a liquid, typically a catholyte, flows past and through. On the opposing side of the membrane lies a metallic or alloy-based electrode in ionic contact with the membrane. In this instance, the system contains only one liquid, typically a catholyte, with the dissolved electrochemical component.

Flow batteries may also be referred to as a regenerative fuel cell or a secondary fuel cell. The energy stored in a flow battery may be governed by the size of the anolyte and/or catholyte storage tanks.

Types of flow batteries may include, for example, redox, hybrid, organic, metal hydride, nano-network, or semi-solid.

A redox type flow battery may be characterized as a flow battery with reversible oxidization and reduction reactions occurring at the porous electrodes within the catholyte and analyte chambers; wherein the catholyte and analyte are separated by an ion-exchange or ion-selective membrane, or some instances a ceramic ion-conducting membrane. An ion-exchange or ion-selective or ceramic ion-conducting membrane may be cationic or anionic depending on the system. An example of a redox type flow battery may include, for example, vanadium redox flow, polysulfide redox flow, uranium redox flow, zinc-polyiodide redox flow, zinc-bromide redox flow, zinc-cerium redox flow, etc. In a redox-type flow battery, a dielectrically heatable material is assumed to be embedded within the ion exchange or conducting membrane.

A hybrid type flow battery may be characterized as a flow battery where only one liquid component flows into the cell reactor, typically a catholyte; wherein one chamber has a porous electrode and current collector and the other consists of only a solid electrode and current, typically in metallic or alloy form. An ion-exchange or ion-selective or ceramic ion-conducting membrane separates the two chambers. A metallic or alloy electrode is in ionic contact with the ion-exchange or ion-selective or solid ion-conducting membrane, typically through an ionic conducting solution. The catholyte flows through the porous electrode on the opposing side of the membrane. An example of a hybrid type flow battery may include, for example, lead-acid, iron-salt, zinc-bromide, or zinc-cerium where zinc metal is the electrode, lithium, or sodium types where metallic lithium or sodium is the electrode. In a hybrid type flow battery, a dielectrically heatable material is assumed to be embedded within the ion exchange or conducting membrane.

A semi-solid flow battery may be characterized as a flow battery with active secondary battery intercalation materials suspended in the catholyte and analytes, wherein ions, typically lithium or sodium, intercalate into and out of the active materials. During the discharge process, ions intercalate out of the active materials in the catholyte and intercalate into the active materials in the analyte. The reverse process occurs in the charging process. Alternatively, the active materials may be stationary and located in the collection tanks as opposed to being suspend. In such a flow designs, the catholyte and analyte are more accurately referred to as an electrolyte, and a porous separate is used to allow ions to flow back and forth as opposed to an ion-exchange membrane. In the instance that the active materials are suspended in the electrolyte, the porous separator prevents the crossing or mixing of said active materials. In a semi-solid flow battery, dielectrically heatable materials are assumed to be suspended in the electrolyte solution on both sides of the porous membrane or fixed in the reactor chamber. It could also be further assumed, and as another example, that the dielectrically heatable materials are deposed on, or embedded within the porous membrane.

Other types of flow batteries such as, for example, organic, both aqueous and nonaqueous types, metal hydride, and nano-structure; wherein the flow batteries have a similar design to either that of a redox or hybrid system, and use an ion-exchange, ion-selective, or ceramic ion conducting membrane. Electrodes, catholytes, and analytes are specific for each system and are described elsewhere in the art. In such systems a dielectrically heatable material is assumed to be embedded within the conducting membrane.

The present description relates to fuel cells.

A fuel cell may be referred to as an electrochemical cell that continuously converts the chemical energy of a fuel, typically hydrogen, into direct electrical energy or direct current without the ability to store it for later use, also referred to as an electrochemical energy conversion system.

A typical fuel cell is composed of a negative electrode (anode) and a positive electrode (cathode), which are separated by an ionic conducting electrolyte. The electrodes, typically porous carbon, may be coated with, or contain, or composed of a catalyst, which may vary by fuel cell types. A negative electrode catalyst may include, for example, platinum which is used to convert hydrogen gas into protons and electrons. Electrons travel from the negative electrode to the positive electrode through an electrical circuit containing what is often referred to as the load, while hydrogen ions conduct or are exchanged through the electrolyte to the positive electrode. A positive electrode catalyst may include, for example, nickel that converts the hydrogen ions into water, a byproduct, using an oxidizing agent, typically oxygen. However, the makeup of the fuel cell components, and the process of generating electricity is dependent on the fuel cell type.

Fuel cells may be arranged in stacks, often referred to as a stacked fuel cell or simply the fuel cell. The stacks may be connected in series to reach sufficient voltage.

The fuel used in fuel cells is typically in the form of hydrogen gas. In some instances, hydrogen gas is supplied directly to the fuel cell. In other instances, hydrogen gas is derived from another fuel sources such as, for example, coal, butane, methanol, ethanol, diesel, etc. The conversion of such fuels to hydrogen may be done externally of the fuel cell, or internally within the fuel cell structure. In yet another instance, a non-hydrogen fuel source may be directly used such as, for example, methanol in which such fuel cells may be referred to as direct methanol fuel cells.

Fuel cells may be classified depending on the type of electrolyte and start up time. A start up time may be referred to as the time it takes to turn on or initiate the conversion process until max efficiency of said fuel cell is reached.

Types of fuel cells may include, for example, proton exchange membrane fuel cells, phosphoric acid fuel cells, solid acid fuel cells, alkaline fuel cells, solid oxide fuel cells, or molten-carbonate fuel cells.

A proton exchange membrane fuel cell (PEMFC), also referred to as a solid polymer electrolyte fuel cell, may be characterized as a fuel cell with a polymer electrolyte, typically Nafion, a sulfonated tetrafluoroethylene based fluoropolymer-copolymer, which conducts hydrogen atoms from the negative electrode to the positive electrode. In such a fuel cell hydrogen diffused to the anode catalyst where it is dissociated into protons and electrons. The protons conduct through the membrane to the positive electrode (cathode) where they react with oxygen at the cathode catalyst to form water as a byproduct. Electrodes are typically composed of carbon papers coated with a catalyst. The electrodes and polymer membrane structure may be referred to as the membrane electrode assembly (MEA). PEM fuel cells may also contain bipolar plates typically composed of, for example, graphite, C-C composites, metal, coated metal, carbon-polymer composites, etc. Fuels other than hydrogen may be used such as, for example, chemical hydrides, diesel, and methanol which may be further classified as a direct-methanol fuel cell or indirect methanol fuel cell.

A phosphoric acid fuel cell (PAFC) may be characterized as a fuel cell that uses phosphoric acid as the electrolyte to conduct hydrogen ions or protons, as opposed to the Nafion membrane in PEMs. A PAFC typically has the same features of, and functions in a similar matter to, PEM fuel cells. PAFCs operate at a higher temperature than PEMs, typically in the range of 150 to 200 degrees Celsius. It is assumed that dielectrically heatable materials would be suspended within the phosphoric acid electrolyte. Dielectrically heatable materials may be used to heat up the electrolyte to desired temperatures in cold weather.

A solid acid fuel cell (SAFC) may be characterized as a fuel cell that uses a solid acid material as the electrolyte membrane; wherein the solid acid material may undergo a phase transition at temperatures above 140 degrees Celsius to become a highly disordered superprotonic structure with increased ionic conductivity. Solid acid materials may include, for example, cesium hydrogen sulfate ($CsHSO_4$) or cesium dihydrogen phosphate ($CsH_2PO_4$). SAFC typically operate in the range of, for example, 140-150 degrees Celsius. It is assumed that the dielectrically heatable materials would be embedded within the solid acid electrolyte material. The dielectrically heatable materials may be used to heat up the electrolyte to, and maintain at, the desired temperature to form the superprotonic structure in cold weather, and in some cases at ambient conductions when needed.

An alkaline fuel cell (AFC), also referred to as a hydrogen-oxygen fuel cell, may be characterized as a fuel cell that uses an alkali metal hydroxide solution such as potassium hydroxide or sodium hydroxide as the electrolyte. In AFCs hydrogen gas and oxygen gas (typically atmosphere) is bubbled into the electrolyte through a porous carbon electrode coated with a catalyst. The design structure of an AFC is assumed to be similar in nature to a PEM. AFC typically operate in a temperature range of 70-140 degrees Celsius. Dielectrically heatable materials may be suspended or embedded within the solution to heat up the electrolyte to, and maintain at, the desired temperature in cold weather, and in some cases at ambient conductions when needed.

A solid oxide fuel cell (SOFC), also referred to as a high temperature fuel cell, may be characterized as a fuel cell that uses a ceramic-based electrolyte capable of conducting oxygens ions from the positive electrode (cathode) to the negative electrode (anode). SOFC differs from other fuel cell types wherein its oxygen ions conducting to the negative electrode as opposed to hydrogen ions or protons conducting to the positive electrode. Oxygen ions conduct to the negative electrode to react with hydrogen gas to produce electricity and water as byproducts. A ceramic electrolyte in SOFC may include, for example, yttria-stabilized zirconia (YSZ) or cerium gadolinium oxide (CGO). The electrolyte may be in the form of, for example, planar, non-planar, rolled, rod, tubular, etc. An SOFC may have the capability of reforming non-hydrogen fuels such as, for example, propane, methane, or butane into hydrogen gas. SOFCs may have a high operating temperature range of 800-1000 degrees Celsius in order to achieve sufficient oxygen conductivity. Dielectrically heatable materials may be embedded within, or on the surface of, the ceramic electrolyte to heat up, and maintain at, the desired temperature in cold weather, and in some cases at ambient conductions when needed. The dielectrically heatable materials may also be used to reduce the startup time of SOFCs in cold weather, and in some instances at ambient conductions when needed.

A molten-carbonate fuel cell (MCFC), also referred to as a high temperature fuel cell, may be characterized as a fuel cell that contains a lithium potassium carbonate salt electrolyte that is liquefied at high temperatures. The liquification enables the movement of negatively charged carbonate ions. Hydrogen gas reacts with the carbonated ions at the negative electrode to form water, carbon dioxide, and electricity as byproducts. At the positive electrode, oxygen (typically from the atmosphere) reacts with the carbon dioxide and electron byproducts to form carbonate ions, replenishing the electrolyte. MCFCs typically operate at a temperature above 600 degrees Celsius. Dielectrically heatable materials may be embedded or suspended within the salt electrolyte to heat it up, liquefy it, and maintain it at, the desired temperature in cold weather, and in some cases at ambient conductions when needed. The dielectrically heatable materials may also be used to reduce the startup time of MCFCs in cold weather, and in some instances at ambient conditions when needed.

Other types of fuel cells and fuel cell classifications may include, for example, metal hydride fuel cell, electro-galvanic fuel cell, direct formic acid fuel cell (DFAFC), direct carbon fuel cell, direct-ethanol fuel cell, direct-methanol fuel cell, reformed methanol fuel cell, regenerative fuel cell, microbial fuel cell, enzymatic biofuel cell, magnesium-air fuel cell, direct borohydride fuel cell, redox fuel cell (RFC), protonic ceramic fuel cell, direct ceramic fuel cell, tubular solid oxide fuel cell (TSOFC).

The present disclosure relates to the nature of the electrolyte system.

The present description relates to electrolytes in primary battery systems.

Electrolytes for primary batteries may be in liquid form. The liquid electrolyte may include, for example, aqueous, non-aqueous organics, or non-aqueous inorganics.

An aqueous liquid electrolyte may include an ammonium chloride solution as in the case of a Zinc-Carbon battery.

An aqueous liquid electrolyte may include a zinc chloride solution as in the case of a Zinc-Chloride battery.

An aqueous liquid electrolyte may include a silver chloride solution as in the case of a Magnesium battery.

An aqueous liquid electrolyte may include an alkali metal hydroxide solution such as potassium hydroxide or sodium hydroxide as in the case for Alkaline batteries, Silver-Oxide batteries, Mercury batteries, Nickel Oxyhydroxide batteries, Zinc-air batteries, and Aluminum-air batteries. In some instances, the electrolyte may be in the form of seawater containing alkali metal hydroxides as in the case of Aluminum-air batteries.

A non-aqueous organic liquid electrolyte may include lithium perchlorate or lithium tetrafluoroborate dissolved in propylene carbonate as in the case of Lithium Carbon Monofluoride batteries, Lithium Iron Disulfide batteries, Lithium Manganese Dioxide batteries, and Lithium Copper Oxide batteries.

A non-aqueous inorganic liquid electrolyte may include lithium tetrachloroaluminate dissolved in thionyl chloride as in the case of Lithium Thionyl Chloride batteries.

The present description relates to electrolytes in secondary battery systems.

Secondary battery electrolytes may be in the form of, for example, liquid, polymer, gel polymer, solid-state ceramics, or ceramic-polymer composite.

The characteristics of a liquid electrolyte for a secondary battery system may include the following, and may have the nature of, for example, aqueous or organic.

An aqueous secondary battery electrolyte may include sulfuric acid as in the case of lead acid batteries.

An aqueous secondary battery electrolyte may include alkali metal hydroxide as in the case of Nickel Cadmium batteries, Nickel-Metal Hydride batteries, Silver-Zinc batteries, Nickel Iron batteries, Nickel Zinc batteries.

An aqueous secondary battery electrolyte may include a lithium, sodium, potassium, magnesium, aluminum, or iron salt dissolved in water to serve as an electrolyte for a metal-air batteries, wherein specifics of such an electrolyte and systems thereof are further described in the art.

An organic secondary battery electrolyte may be used in ion-based or metal-based, metal-air secondary batteries. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), 1-ethyl-3-methyl-imidoxzoium chloride, or a combination of two or more in a single mixture.

An organic-based secondary battery electrolyte may include a room temperature ionic liquid. Examples of a room temperature ionic liquid may include, imidazolium, pyrrolidinium, piperidinium, ammonium, hexafluorophosphate, dicyanamide, tetrachloroaluminate, sulfonium, phosphonium, pyridinium, pyrazolium and thiazolium.

Organic-based secondary battery electrolytes may include an ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

The characteristics of a polymer electrolyte for a secondary battery system may include the following.

Polymer electrolytes may be used in, for example, ion-based, metal-based, metal-air secondary batteries.

Polymers for the crosslinked polymer matrix may be ionic conducting polymers or nonionic conducting polymers.

Examples of polymers included, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), succinonitrile.

Polymer-based secondary battery electrolytes may include an ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

The characteristics of a gel polymer electrolyte for a secondary battery system may include the following.

Gel polymer electrolytes may be used in, for example, ion-based, metal-based and metal-air secondary batteries.

A gel polymer electrolyte may be composed of, but not limited to, a polymer matrix, an ionic conducting salt and a liquid based electrolyte.

Polymers for the crosslinked polymer matrix in a gel polymer electrolyte may be ionic conducting polymers or nonionic conducting polymers.

Examples of polymers include, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, poly-chlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), succinonitrile.

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

Liquid based electrolytes in gel polymer electrolytes may include, for example organic based liquid electrolyte and ionic liquid electrolyte.

A gel polymer electrolyte may include an organic based liquid electrolyte. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), 1-ethyl-3-methylimidoxzoium chloride, or a combination of two or more in a single mixture.

A gel polymer electrolyte may include a room temperature ionic liquid electrolyte. Examples of room temperature ionic liquid electrolytes may include, for example, imidazolium, pyrrolidinium, piperidinium, ammonium, hexafluorophosphate, dicyanamide, tetrachloroaluminate, sulfonium, phosphonium, pyridinium, pyrazolium and thiazolium.

A gel polymer electrolyte may consist of a mixture of organic based liquid electrolyte and room temperature ionic liquid electrolyte.

The characteristics of a solid-state ceramic electrolyte may include the following.

Solid-state ceramic electrolytes may be used in, for example, ion-based, metal-based and metal-air secondary batteries.

A solid-state ceramic electrolyte includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

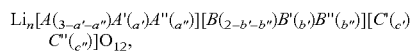

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A'' stand for an octahedral position of the crystal structure, i. where A stands for one or more trivalent rare earth elements, ii. where A' stands for one or more alkaline earth elements, iii. where A'' stands for one or more alkaline metal elements other than Li, and iv. wherein $0 \le a' \le 2$ and $0 \le a'' \le 1$;
b. where B, B', and B'' stand for an octahedral position of the crystal structure, i. where B stands for one or more tetravalent elements, ii. where B' stands for one or more pentavalent elements, iii. where B'' stands for one or more hexavalent elements, and iv. wherein $0 \le b'$, $0 \le b''$, and $b'+b'' \le 2$;
c. where C' and C'' stand for a tetrahedral position of the crystal structure, i. where C' stands for one or more of Al, Ga, and boron, ii. where C'' stands for one or more of Si and Ge, and iii. wherein $0 \le c' \le 0.5$ and $0 \le c'' \le 0.4$; and
d. wherein $n=7+a'+2 \cdot a''-b'-2 \cdot b''-3 \cdot c'-4 \cdot c''$ and $4.5 \le n \le 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \le x \le 2$. In yet another example, a solid-state ionic conductive material includes argyrodites materials the general formula: $Li_{18-2m-x}(M_2^{m+}Y_7^{2-})Y_{2-x}^{2-}X_{x-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof, and x is in the range of $0 \le x \le 2$.

The characteristics of a ceramic-polymer composite electrolyte may include the following.

Ceramic-polymer electrolytes may be used in, for example, ion-based, metal-based and metal-air secondary batteries.

A ceramic-polymer composite electrolyte may be composed of, for example, polymers, ionic conducting salt, ionic conductive ceramics, and nonionic conducting additives.

The polymer may be chemically stable with the ionic conductive ceramics. Alternatively, and in some instances, the polymer may chemically react with the ionic conductive ceramics to improve ionic conductivity.

Polymers for the crosslinked polymer matrix may be ionic conducting polymers or nonionic conducting polymers.

Examples of polymers included, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), succinonitrile.

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example H$^+$, Li$^+$, Na$^+$, K$^+$, Ag$^+$, Mg$^{2+}$, Zn$^{2+}$, Al$^{3+}$, Fe$^{3+}$, etc.

The ionic conductivity of the corresponding ions is preferably to be >10$^{-7}$ S/cm. It is preferably to have lower electronic conductivity (<10$^{-7}$ S/cm).

Examples of the solid-state ionic conductive material include for example a garnet-like structure oxide material with the general formula:

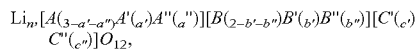

$Li_m[A_{(3-a'-a'')}A'_{(a')}A''_{(a'')}][B_{(2-b'-b'')}B'_{(b')}B''_{(b'')}][C'_{(c')}C''_{(c'')}]O_{12}$, a. where A, A', and A" stand for an octahedral position of the crystal structure, i. where A stands for one or more trivalent rare earth elements, ii. where A' stands for one or more alkaline earth elements, iii. where A" stands for one or more alkaline metal elements other than Li, and iv. wherein 0≤a'≤2 and 0≤a"≤1;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein 0≤b', 0≤b", and b'+b"≤2;

c. where C' and C" stand for a tetrahedral position of the crystal structure, i. where C' stands for one or more of Al, Ga, and boron, ii. where C" stands for one or more of Si and Ge, and iii. wherein 0≤c'≤0.5 and 0≤c"≤0.4; and d. wherein n=7+a'+2·a"−b'−2·b"−3·c'−4·c" and 4.5≤n≤7.5.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP (Li$_1$−xAl$_x$Ge$_{2-x}$(PO$_4$)$_3$), LATP (Li$_1$+xAl$_x$Ti$_{2-x}$(PO$_4$)$_3$) and these materials with other elements doped therein.

In yet another example, a solid-state ionic conductive material includes anti-perovskite structure materials and their derivatives, such as the composition of Li$_3$OCl, Li$_3$OBr, Li$_3$OI.

In yet another example, a solid-state ionic conductive material includes Li$_3$YH$_6$(H=F, Cl, Br, I) family of materials, Y can be replaced by other rare earth elements.

In yet another example, a solid-state ionic conductive material includes Li$_{2x}$S$_{x+w+5z}$M$_y$P$_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: Li$_{12-m-x}$(M$_m$Y$_4^{2-}$)Y$_{2-x}^{2-}$X$_x^{-}$, wherein M$^{m+}$=B$^{3+}$, Ga$^{3+}$, Sb$^{3+}$, Si$^{4+}$, Ge$^{4+}$, P$^{5+}$, As$^{5+}$, or a combination thereof; Y$^{2-}$=O$^{2-}$, S$^{2-}$, Se$^{2-}$, Te$^{2-}$. or a combination thereof; X$^{-}$=F$^{-}$, Cl$^{-}$, Br$^{-}$, I$^{-}$, or a combination thereof; and x is in the range of 0≤x≤2. In yet another example, a solid-state ionic conductive material includes argyrodites materials the general formula: Li$_{18-2m-x}$(M$_2^{m+}$Y$_7^{2-}$)Y$_{2-x}^{2-}$X$_{x-}^{-}$, wherein M$^{m+}$=B$^{3+}$, Ga$^{3+}$, Sb$^{3+}$, Si$^{4+}$, Ge$^{4+}$, P$^{5+}$, As$^{5+}$, or a combination thereof; Y$^{2-}$=O$^{2-}$, S$^{2-}$, Se$^{2-}$, Te$^{2-}$, or a combination thereof; X$^{-}$=F$^{-}$, Cl$^{-}$, Br$^{-}$, I$^{-}$, or a combination thereof; and x is in the range of 0≤x≤2.

The ionic conductive ceramics may have a weight content of 0.1 to 99.9% relative to the polymer content.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

The present description relates to electrolytes in an electrochemical capacitor.

Electrolytes in electrochemical capacitors may consist of a solvent and dissolved chemicals that dissociate into positive cations and negative anions, within said solvent. The solvent may be aqueous, organic, or an ionic liquid. The solvent may govern the parameters of an electrochemical capacitor. For instance, an aqueous electrolyte may be used for high power applications where energy density is not essential. In another instance, an ionic liquid electrolyte may be used for higher energy applications where power density is not as essential. In yet another instance, organic electrolytes may be used to provide moderate energy and power density.

Aqueous electrolytes may include, for example, sulfuric acid (H$_2$SO$_4$), alkali metals such as potassium hydroxide or sodium hydroxide, quaternary phosphonium salts, sodium perchlorate, lithium perchlorate, potassium chloride, sodium sulfite, sodium sulfate, or lithium hexafluoride arsenate.

Organic electrolytes may include an organic electrolyte and a salt. A typical organic solvent may include, for example, propylene carbonate, tetrahydrofuran, diethyl carbonate, or y-butyrolactone. Salts may include, for example, quaternary ammonium salts, alkyl ammonium salts such as tetraethylammonium tetrafluoroborate (N(Et) or triethyl(methyl)tetrafluoroborate (NMe(Et)$_3$BF$_4$)

Ionic liquid electrolytes may include, for example, a room temperature ionic liquid electrolyte. Examples of room temperature ionic liquid electrolytes may include, for example, imidazolium, pyrrolidinium, piperidinium, ammonium, hexafluorophosphate, dicyanamide, tetrachloroaluminate, sulfonium, phosphonium, pyridinium, pyrazolium and thiazolium.

The present description relates to electrolytes in flow batteries.

Electrolytes in flow batteries may be referred to as ion-exchange, ion-selective, or ceramic ion-conducting membranes.

Membranes may be in the form of, for example, polymers, ceramic, or ceramic-polymer composites.

A polymer membrane may be composed of Nafion, or a sulfonated tetrafluoroethylene-based fluoropolymer-copolymer, in the case of an ion exchange membrane.

A polymer membrane may be composed of polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(m-ethylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), succinonitrile A polymer ion exchange membrane may include, for example, a hydrophilic cellulose nanocrystals mixed with poly(vinylidene fluoride)-co-hexafluoropropylene (PVDF-HFP). The hydrophilic cellule nanocrystal/PVDF-HFP membrane may be supported by a fabric support.

Polymers specific to flow type batteries such as, for example, vanadium redox flow batteries, polysulfide redox flow batteries, uranium redox flow batteries, zinc-polyiodide redox flow batteries, zinc-bromide redox flow batteries, zinc-cerium redox flow batteries, zinc-bromide hybrid flow batteries, zinc-cerium redox flow batteries, organic redox flow batteries, metal hydride redox flow batteries, and non-structured redox flow batteries may be found elsewhere in the art.

A solid ion-conducting ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

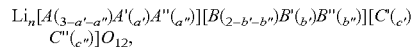

a. where A, A', and A" stand for an octahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 b'$, $0 b''$, and $b' + b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 c' - 4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4{}^{2-})Y_{2-x}{}^{2-}X_x{}^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$. In yet another example, a solid-state ionic conductive material includes argyrodites materials the general formula: $Li_{18-2m-x}(M_2{}^{m+}Y_7{}^{2-})Y_{2-x}{}^{2-}X_x{}^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

The present description relates to electrolytes in fuel cells.

A fuel cell electrolyte may be composed of a polymer such as Nafion, or a sulfonated tetrafluoroethylene-based fluoropolymer-copolymer, in the case of a proton exchange membrane (PEM).

A fuel cell electrolyte may be composed of phosphoric acid as in the case of a phosphoric acid fuel cell (PAFC).

A fuel cell electrolyte may be composed of a solid acid such as cesium hydrogen sulfate ($CsHSO_4$) or dihydrogen phosphate ($CsH_2PO_4$), wherein the solid acid undergoes a phase transition to become a highly disordered superprotonic structure at elevated temperatures, in the case of a solid acid fuel cell (SAFC).

A fuel cell electrolyte may be alkali metal hydroxide aqueous solution such as potassium hydroxide or sodium hydroxide as in the case of an alkaline fuel cell (AFC).

A fuel cell electrolyte may be an oxygen ion conductive ceramic such as yttria-stabilized zirconia (YSZ) or cerium gadolinium oxide (CGO), as in the case of solid oxide fuel cells (SOFCs).

A fuel cell electrolyte may be a salt such as lithium potassium carbonate where in the salt is liquified at elevated temperatures, as in the case of molten-carbon fuel cell (MCFC).

The present description relates to dielectric heating.

Dielectric heating may be defined as a process by which an electromagnetic wave is applied to an electrochemical cell, such as by way of applying the electromagnetic wave to the current collectors of an electrochemical cell. The electromagnetic wave can be coupled with dielectrically heatable materials with a high dielectric loss or loss tangent value ($\delta$) of at least $1 \times 10^{-5}$, in the frequency range of $10^3$ to $10^{12}$ Hz. An electromagnetic wave may induce a polarization change in the dielectrically heatable materials, causing rapid electron shift within the dielectrically heatable materials, producing an alternating current within. The internal alternating current may generate heat, heating up the dielectrically heatable material, and thus heating the electrolyte.

The dielectrically heatable material can also be the electrolyte itself provided that said electrolyte has a sufficiently high dielectric loss.

The parameters of the wave may be tuned to specifically heat the embedded dielectrically heatable materials. For instance, the frequency of the wave can be tuned to co-resonate specifically with the dielectrically heatable material to achieve maximum absorption.

The present description relates to dielectrically heatable materials.

Dielectrically heatable materials may include, for example, any material with a minimum dielectric loss of 0.5% or higher, more preferably a minimum dielectric loss of 1% or higher, more preferably a minimum dielectric loss of 2% or higher, more preferably a minimum dielectric loss of 3% or higher, more preferably a minimum dielectric loss of 4% or higher, more preferably a minimum dielectric loss of 5% or higher, and preferably any material with an electrical conductivity below $10^{-10}$ S/cm.

Dielectrically heatable materials may include, for example, any material with a loss tangent value ($\delta$) of $1 \times 10^{-5}$ or higher in the frequency range of $10^3$ to $10^{12}$ Hz, more preferably a loss tangent value ($\delta$) of $1 \times 10^{-4}$ or higher in the frequency range of $10^3$ to $10^{12}$ Hz, more preferably a loss tangent value ($\delta$) of $1 \times 10^{-3}$ or higher in the frequency range of $10^3$ to $10^{12}$ Hz, more preferably a loss tangent value ($\delta$) of $1 \times 10^{-2}$ or higher in the frequency range of $10^3$ to $10^{12}$ Hz, more preferably a loss tangent value ($\delta$) of $1 \times 10^{-1}$ or higher in the frequency range of $10^3$ to $10^{12}$ Hz, more preferably a loss tangent value ($\delta$) of 1 or higher in the frequency range of $10^3$ to $10^{12}$ Hz, and preferably any material with an electrical conductivity below $10^{-10}$ S/cm.

Dielectrically heatable materials may be electrically insulative. Dielectrically heatable materials may be composed of, for example, polymers, inorganic compounds, organic-inorganic composite, or mixture, etc.

An example of a dielectrically heatable material may include, but not limited to, acrylonitrile butadiene, acetyl cellulose, acrylonitrile resin, acrylic resin, alkyd resin alumina porcelain, aluminum oxide, aluminum hydride, aniline, aniline resin, amber, aminoalkyl resins, asbestos, styrene-acrylonitrile resin, antimony tribromide, Bakelite, barium nitrate, barium titanate, barium strontium titanate, barium chloride, beryllium aluminum cyclosilicate, calcium hypochlorite, borosilicate, butyl rubber, butyrate, calcite, calcium, calcium hydroxide, calcium phosphate, calcium silicate, calcium copper titanate, calcium magnesium carbonate, carbolic acid, celluloid, cellulose, cellulose acetate, hydrophilic cellulose nanocrystals cellophane, cevine, chromite, dextrin, diallyl phthalate, diamond, feldspathic porcelain, ferric oxide, ferrite, ferrosilicon, ferro-manganese, ferrule resin, fluorine resin, fluorinated alumina, calcium fluoride, furan resin, glass, hafnium oxide, lead nitrate, manganese dioxide, marble, melamine resin, mica, micanite, mirror stone, naphthalene, natural rubber, neoprene, nylon, paraffin, pebble, phenol, polyacetal resin, polyamide, polybutylene, polycarbonate, polyester, polyethylene, polyethylene oxide, poly methyl acrylate, polypropylene, polystyrene, polystyrol, polysulfone, polytetrafluoroethylene, porcelain, polyvinyl alcohol, pyranol, quartz, potassium sodium tartrate tetrahydrate, rubber, ruby, sand, selenium, shellac, silica alumina, silicon, silicon resin, silk, slate, sodium-line glass, sodium carbonate, sodium chloride, sodium dichromate, soapstone, steatite, styrene-butadiene rubber, styrene resin, strontium titanate, superphosphate, sulfur dioxide, talc, Teflon, titanium dioxide, urea, urea resin, vanadium sulfide, wood, zinc oxide, etc.

A dielectrically heatable material may be coated with a thin insulate layer to enhance electrochemical stability or to further increase the insulative properties of the embedded or suspended dielectrically heatable materials.

Dielectrically heatable materials may be in the form of, for example, zero or one-dimension particles, a two-dimension flakes, or sheet, a one or two-dimension wire or fiber, or a fabric/mesh support, or the electrolyte material itself.

Dielectrically heatable particles embedded or suspended in the electrolyte may have the following characteristics.

Dielectrically heatable particles may be defined as zero-dimension powders, wherein the powders can be either inorganic or organic, wherein the powders have a high dielectric loss.

Dielectrically heatable particles may be defined as two-dimensional flakes, or sheets, wherein the flakes or sheets can be either inorganic or organic, wherein the flakes or sheets have a high dielectric loss.

Dielectrically heatable particles may have a diameter or particle size in the range of $0.01<d<1000$ μm, with a preferred range of $0.1<d<10$ μm with any possible shapes.

Dielectrically heatable particles may be commonly referred to as, for example, quantum dots, nano dots, powder, micro particles, flakes, sphere, microspheres, nanospheres, etc.

Dielectrically heatable particles may be suspended or dispersed by the use of a surfactant, in the case of liquid electrolytes.

Surfactants may be anionic, cationic, nonionic, or amphoteric. Anionic surfactants may include, for example, sulfates ($C_nH_{2n+1}OSO_3^-Na^+$), sulfonates ($C_nH_{2n+1}SO_3H$), phosphates ($C_nH_{2n+1}OPO_3H_2$), carboxylates ($C_nH_{2n+1}COOH$). Cationic surfactants may include, for example, alkylammonium ($C_nH_{2n+1}(CH_3)NX[X=OH, Cl, Br, HSO_4]$), dialkylammonium (($C_{16}H_{33})_2(CH_3)_2N^+Br^-$). Non-ionic surfactants may include, for example, primary amines ($C_nH_{2n+1}NH_2$), polyethylene oxides ($HO(CH_2CH_2O)_nH$).

Dielectrically heatable particles may be suspended or dispersed in a precursor solution and then become part of the final electrolyte matrix, in the case of polymer, gel polymer, or ceramic-polymer composite electrolytes.

Dielectrically heatable particles may be deposited onto a fabric support using methods such as, for example, drop casting, spin coating, spraying, tape casting, dip coating, evaporation, Langmuir-Blodgett, gel casting, chemical vapor deposition, physical vapor deposition, etc., prior to the coating of a polymer, gel polymer, or ceramic-polymer composite electrolytes.

Dielectrically heatable particles may be added to a ceramic mixture prior to the electrolyte formation, in the case of solid-state electrolytes or ceramic-polymer composite electrolytes.

Dielectrically heatable particles may be located at the surface of the electrolyte and in contact with, for example, a separator, fabric substrate, negative electrode, or positive electrode.

Dielectrically heatable particles may be deposited onto a porous battery separator. An electrochemical cell separator is defined as a porous material that allows ions and liquid to pass through and not selective toward any ions.

Porous battery separator materials may include, for example, nonwoven fibers, such as cloth, nylon, polyester, glass fiber, glass mats, polymers, such as polyethylene, polypropylene, poly(tetrafluoroethylene, polyvinyl chloride, polyamide, polyolefin, polyacrylonitrile, cellulose, and natural materials, such as wood, rubber, and asbestos.

Dielectrically heatable particles may be deposited onto, or within, a separator using methods such as, for example, drop casting, spin coating, spraying, tape casting, dip coating, evaporation, Langmuir-Blodgett, gel casting, chemical vapor deposition, physical vapor deposition, etc.

Dielectrically heatable particles may be introduced into the separator production process so that the dielectrically heatable materials are embedded in the separators Dielectrically heatable particles deposited in or on a separator material may be in contact with, for example, an electrolyte, negative electrode, positive electrode, or a combination thereof.

In some instances, a porous battery separator itself may be the dielectrically heatable material, provided that it is composed of a material with a sufficient dielectric loss.

Dielectrically heatable wires or fibers embedded in the electrolyte may have the following characteristics.

Dielectrically heatable wires or fibers may be defined as a one-dimensional or two-dimensional material.

A dielectrically heatable wire or fiber may have a diameter in the range of $0.01<d<3000$ μm, with a preferred range of $0.1<d<10$ μm.

The diameter of the wires or fibers may be further defined by the American wire gauge with a range of $10<d<40$ AWG. The diameter of the wires or fibers may further exceed 40 AWG.

Dielectrically heatable wires or fibers may be commonly referred to as, for example, nanowires, nanofibers, microwires, microfibers, nanotubes, microtubes, multiwalled, single walled, etc.

The electrolyte may contain a single wire or fiber positioned near its surface or embedded within its matrix.

The dielectrically heatable wire or fiber may have an orientation of, for example, straight, spiral, curled, bent, or randomly orientated.

In the case of a straight orientation, it is preferred that the straight dielectrically heatable wire or fiber be positioned in the middle of the electrolyte away from both the positive and negative electrodes. Alternatively, the straight dielectrically heatable wire or fiber may be positioned onto one side of the electrolyte in proximity to the negative electrode or positive electrode. Such an alternative may be required in the event a fabric support is positioned within the electrolyte.

In the case of a spiral, curled, or bent orientation, it is preferred that a single dielectrically heatable wire or fiber is flat and may be what is commonly referred to as a pancake shape. In such an instance, it is preferred that the pancake shape wire or fiber will be embedded in the middle of the electrolyte away from both the positive and negative electrodes. Alternatively, the dielectrically heatable pancake shaped wire or fiber may be embedded within the electrolyte near one surface. Such an alternative may be required in the event a fabric support is positioned within the electrolyte.

In the case of a random orientation, the dielectrically heatable wire or fiber may be orientated or transverse throughout an electrolyte in an undefined fashion. The dielectrically heatable wire or fiber may be suspended or mixed within the electrolyte precursor prior to formation as in the case of a polymer, gel polymer, ceramic-polymer composite, or solid-state electrolyte.

The electrolyte may contain more than one wire or fiber positioned near its surface or embedded within its matrix.

The multiple dielectrically heatable wires or fibers may be orientated in the position of, for example, straight, mesh, or randomly orientated.

In the case of a straight orientation, it is preferable that multiple dielectrically heatable wires or fibers run area wise of the electrolyte. It is preferred that the dielectrically heatable wires or fibers run parallel to one another. Alternatively, the dielectrically heatable wires or fibers may have some overlap within one another. It is preferable that the dielectrically heatable wires or fibers by positioned in the middle of the electrolyte away from both the positive and negative electrodes. Alternatively, the dielectrically heatable wires or fibers may be positioned onto one side of the electrolyte in proximity to the negative electrode or positive electrode. Such an alternative may be required in the event a fabric support is positioned within the electrolyte.

In the case of a mesh orientation, it is preferable that the multiple dielectrically heatable wires or fibers run area wise of the solid electrolyte. It is preferred that the dielectrically heatable wires or fibers run perpendicular to one another forming a screen or grid like structure. The screen or grid-like structure may have a knitted, woven, or nonwoven fashion. It is preferred that the dielectrically heatable wires or fibers, in the form of a mesh, be positioned in the middle of the electrolyte away from both the positive and negative electrodes. Alternatively, the dielectrically heatable wires or fibers in the form of a mesh may be positioned onto one side of the electrolyte in proximity to the negative electrode, or positive electrode. Such an alternative may be required in the event a fabric support is positioned within the electrolyte.

In the case of a random orientation, the multiple dielectrically heatable wires or fibers may be orientated or transverse throughout an electrolyte. The dielectrically heatable wires or fibers may be suspended or mixed within the electrolyte precursor prior to formation as in the case of a polymer, gel polymer, ceramic-polymer composite, or solid-state electrolyte.

A dielectrically heatable material may be a fabric or mesh support with dielectric heating properties used to support the electrolyte, wherein the fabric or mesh is used as both a dielectrically heatable material and the supporting material for polymer, gel polymer, or ceramic-polymer composite electrolytes.

The present description relates to the dielectric heating system.

An electromagnetic wave generator may be used to apply an electromagnetic wave to the positive or negative current collectors of an electrochemical cell, through a positive or negative terminal, respectfully, wherein the generator is positioned within the primary, or a secondary, electrical circuit, of an electrochemical system, exterior of the electrochemical cell.

An electromagnetic wave generator may be positioned within the primary electrical circuit, wherein the wave is applied to the current collectors of an electrochemical cell through the primary positive and/or negative terminals of said electrochemical cell.

An electromagnetic wave generator may be positioned within a secondary electrical circuit, wherein the wave is applied to the current collectors of an electrochemical cell through a secondary set of positive and/or negative terminals extruding from the housing or casing of said electrochemical cell.

Within an electromagnetic generator, an LC circuit resonant frequency may be adjusted by adjusting the inductance of an inductor or capacitance of a capacitor or that of multiple inductors and/or capacitors connected in the dielectric heating circuit, the adjustment can be mechanically or electronically.

A single electromagnetic wave generator may be used to heat a single electrochemical cell. An example may include a redox-type flow battery, wherein a single electromagnetic wave generator is used to heat a large-scale redox flow-type battery used in a grid storage backup.

A single electromagnetic wave generator may be used to heat a group of one or more electrochemical cells. An example may include a fuel cell stack, wherein a single electromagnetic wave generator is used to heat an entire stack of proton exchange membrane-based fuel cells.

An electromagnetic wave generator may be used to heat one or more groups of electrochemical cells. An example may include an electric vehicle battery pack, wherein a single electromagnetic wave generator is used to heat two or more battery modules consisting of two or more electrochemical cells or secondary batteries.

The dielectric heating system may have the following characteristics.

A dielectric heating system may operate in a high frequency range of, for example, $10^3 \leq f \leq 10^{12}$ Hz. The frequency range may include, for example, microwave, radio, infrared, etc.

The electromagnetic wave applied to the current collectors may be continuous or pulsed.

A pulsating electromagnetic wave may be pulsed at intervals with a duration in the range of $0.001 \leq s \leq 1000$ seconds, with a preferred range of $1 \leq s \leq 10$ seconds. Time between intervals may have a duration in the range of $0.01 \leq s \leq 1000s$, with a preferred range of $0.1 \leq s \leq 10$ seconds.

It is assumed that a pulsating electromagnetic wave at longer durations, and with less time between the intervals, is used to heat up an electrochemical cell in cold environments to a desired temperature near ambient conditions.

It is assumed that a pulsating electromagnetic wave at shorter durations, and with more time between the intervals, is used to stabilize a temperature, and said temperature is near ambient conditions, wherein the electrochemical cell is in a cold environment.

It is assumed that a pulsating electromagnetic wave at longer durations, and with more time between the intervals; or alternatively, shorter duration, and with less time between the intervals are used to heat up and maintain an electrochemical cell at elevated temperature above ambient conditions, wherein the electrochemical cell is in a cold environment.

A pulsed electromagnetic wave is assumed to be used so as to not overheat or damage the electrochemical cell and the surrounding components. And that the pulsation of the electromagnetic wave is engineered and controlled to perform the specific function of the dielectric heating system without detrimental side effects to the electrochemical cell.

Alternatively, a continuous electromagnetic wave may be used. In this instance, it is assumed that the electrochemical cell must be maintained at a temperature well above ambient conditions. An example of an electrochemical cell may include a solid oxide fuel cell or SOFC in which the temperature above 800 degrees Celsius must be maintain. Another example of an electrochemical cell may include a molten-carbonate fuel cell (MCFC) or a molten-salt battery where in the electrolyte must be kept at an elevated temperature to remain in a molten state. Though these are only examples for the use of a continuous electromagnetic wave, a continuous electromagnetic wave may be used for any other electrochemical cell when needed or desired. Vice versa, SOFC, MCFC, and molten-salt batteries may be heated using a pulsated electromagnetic wave when needed or desired. It is assumed that the use of a continuous electromagnetic wave will not overheat or damage the electrochemical cell and the surrounding components.

It is assumed that the dielectric heating system is designed and engineered to specifically target the dielectrically heatable materials embedded or suspended in the electrolyte. Thus, the dielectrically heatable materials to be embedded or suspended, the frequency of the electromagnetic wave, the choice of continuous or pulsed, as well as the parameters thereof, are all chosen, designed, and engineered to target the embedded or suspended dielectrically heatable materials. However, other components in the electrochemical cells such as the positive electrode, negative electrode, current collectors, tabs, packaging, bipolar plates, etc., may be heated as a byproduct of the dielectric heating system.

It is further assumed that the dielectric heating system is designed and engineered as to not damage the other components of the electrochemical cell, or to deteriorate the electrochemical cell, or to result in the shortening of the life expectancy or performance of the electrochemical cell.

Though the electrolyte is the target of the dielectric heating system, dielectric heating may be used to heat materials in the positive and/or negative electrode such as the active electrochemical materials, materials used to bind the active electrochemical materials to the current collector, or any dielectrically heatable additives added to the electrodes. These materials may be heated as a secondary byproduct of the dielectric heating system, wherein the electromagnetic wave is coupled with a dielectrically heatable material embedded or suspended in the electrolyte, or in some cases the electrolyte material itself, and the materials within the positive and negative electrodes are heated as a secondary result. Alternatively, the electromagnetic wave may be coupled with one or more of the dielectrically heatable materials in the positive and/or negative electrodes, wherein the dielectric heating system is used to heat these material, wherein the purpose of heating these materials is to heat the electrolyte which is assumed to be in direct proximity to the electrode, or electrode containing, materials.

In the case of a solid-state ion-based or metal-based secondary battery, the electromagnetic wave may be tuned to the ionic conductive media, or dielectrically heatable materials embedded in the ionic conductive media, embedded in the positive electrode, known as a catholyte in the art, and/or embedded in the negative electrode, known as an anolyte in the art.

The dielectric heating system, or electromagnetic wave, may also be coupled with any thin dielectrically heatable layers within the electrochemical system, wherein the dielectrically heatable layer is heated which in term heats up the electrolyte, which is assumed to be in direct, or least in close, proximity to the electrolyte. An example of a dielectrically heatable layer may include a thin layer of aluminum oxide or lithium phosphorus oxynitride on the surface of lithium metal used to improve electrochemical stability and wettability with a solid electrolyte. An alternative example may include a thin layer of lithium borate oxide ($Li_3BO_3$) on the surface of a garnet-structure LLZO solid-state electrolyte to act as a buffer layer to promote stability with positive and/or negative electrode. Another alterative example may include a thin layer of aluminum oxide on the interior surface of the current collector which serves as a template for highly aligned carbon nanotube growth, wherein the carbon nanotubes are used as a material in the positive and/or negative electrode.

The drawing of the present disclosure further describes systems and methods of dielectric heating of dielectrically heatable materials embedded within the electrolyte of various electrochemical systems. In the drawings, reference is made to: 002 Dielectrically heatable material; 004 Dielectrically heatable particle; 006 Optional insulative coating layer; 008 Surfactant; 010 Manganese dioxide/carbon paste positive electrode; 012 Zinc powder/gel negative electrode; 014 Potassium hydroxide with dielectrically heatable materials suspended within; 016 Porous separator; 018 Anode current collector; 020 Container; 022 Intercalation cathode material; 024 Positive electrode current collector; 026 Intercalation anode material; 028 Negative electrode current collector; 030 Polymer electrolyte with dielectrically heatable materials suspended within; 032 Porous fuel cell anode; 034 Anode catalyst; 036 Porous fuel cell cathode; 038 Cathode catalyst; 040 Phosphoric acid with dielectrically heatable materials suspended within; 042 Hydrogen gas; 044 Excess hydrogen gas; 046 Oxygen gas; 048 Excess oxygen gas plus water byproduct; 050 Cathode current collector or bipolar plate; 052 Anode current collector or bipolar plate; 054 Flow battery cell reactor; 056 Catholyte tank; 058 Anolyte tank; 060 Lithium intercalation cathode material; 062 Lithium intercalation anode material; 064 Pump; 066 Lithium-based liquid electrolyte with dielectrically heatable materials suspended within; 068 Dielectrically heatable material; 070 Porous separator with dielectrically heatable material deposited on to the surface; 072 Porous separator with dielectrically heatable material embedded within; 074 Porous separator with dielectrically heatable materials on the surface and embedded within; 076 Cross section view of dielectrically heatable material; 078 Cross section view of a dielectrically heatable wire or fiber; 080 Optional insulative coating layer; 082 Planar view of dielectrically heatable material; 084 Zinc anode; 086 Manganese dioxide cathode; 088 Carbon rod current collector; 090 Embedded dielectrically heatable wire or fiber; 092 Ammonium chloride electrolyte; 094 Molten sodium anode; 096 Nickel cathode; 098 Beta alumina; 100 Molten sodium tetrachloroaluminate; 102 Current collector; 104 Proton exchange membrane; 106 Catholyte tank; 108 Anolyte tank; 110 Ion conducting membrane; 112 Porous flow battery anode; 114 Porous flow battery cathode; 116 Catholyte; 118 Anolyte; 120 Lithium metal; 122 Porous lithium-air battery cathode; 124 Catalyst; 126 Lithium-air battery electrolyte; 128 Dielectrically heatable mesh; 130 Composite cathode; 132 Ceramic-polymer composite electrolyte; 134 Yttria-stabilized zirconia (YSZ); 136 Excess oxygen gas; 138 Excess hydrogen gas plus water byproduct; 140 Ion conducting solution; 142 Positive electrochemical cell terminal; 144 Electrochemical cell; 146 Negative electrochemical cell terminal; 148 Primary electrical circuit to the positive electrochemical cell terminal; 150 Primary electrical circuit to the negative electrochemical cell terminal; 152 Electromagnetic wave generator; 154 Positive electrical circuit lead leading to application or out of the electrochemical system; 156 Negative electrical circuit lead leading to application or out of the electrochemical system; 158 Positive primary electrical circuit, 160 Negative primary electrical circuit, 162 Positive secondary terminal, 164 Negative secondary terminal; 166 Positive secondary electrical circuit; and 168 Negative secondary electrical circuit.

FIG. 1 A schematic illustration of dielectrically heatable materials suspended in liquid-based electrochemical cell. An electrochemical cell may include a primary battery such as an Alkaline battery, wherein the dielectrically heatable materials (002) are suspended in a potassium hydroxide solution and composed of a dielectrically heatable particles (004) coated with an optional insulative layer (006) and enclosed within a surfactant (008). The alkaline battery may include a zinc powder/gel anode (012) coated on an anode current collector (018) and a manganese dioxide/carbon paste cathode (010) coated onto the container (020), which are separated by porous separator (016) and potassium hydroxide solution with dielectrically heatable materials suspended within (014).

Figure 2:
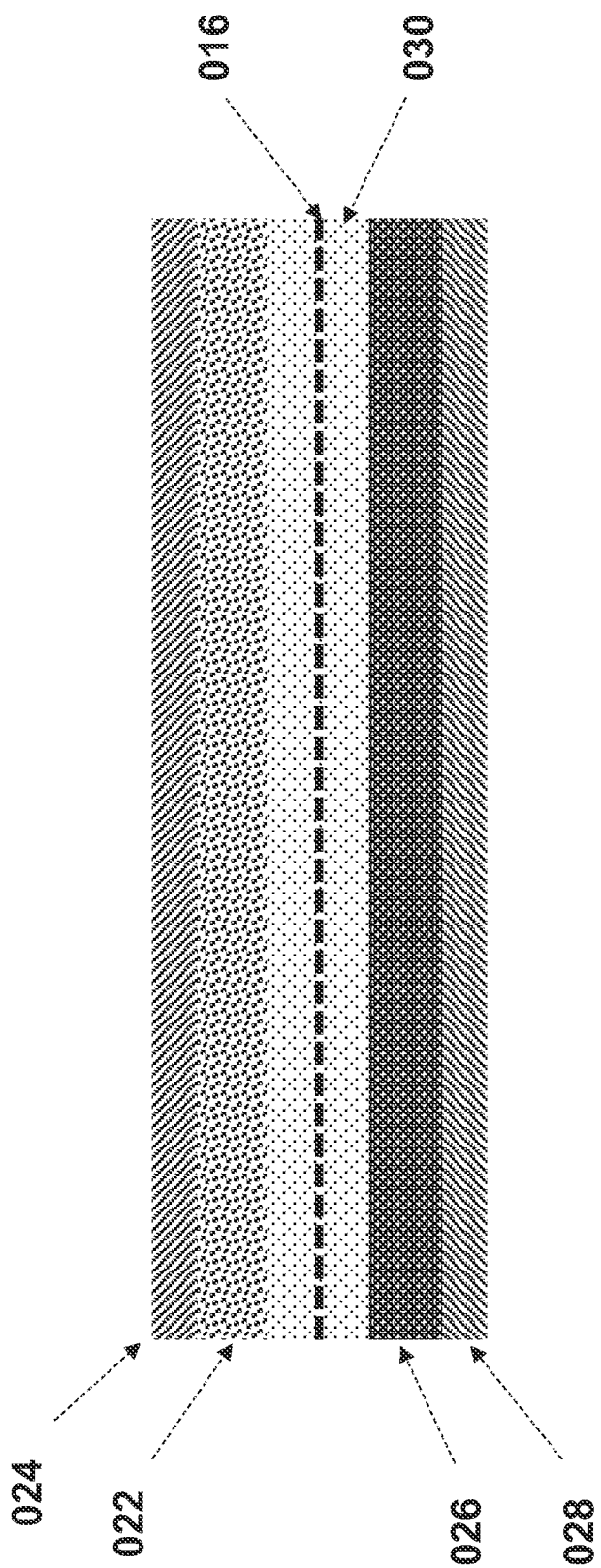
FIG. 2: A schematic illustration of dielectrically heatable materials suspended in the solid polymer electrolyte of a solid-state lithium-ion battery.

FIG. 2: A schematic illustration of dielectrically heatable materials suspended in a solid-state electrochemical cell. An electrochemical cell may include an ion-based secondary lithium battery wherein the dielectrically heatable materials are suspended in a solid polymer electrolyte (030). The lithium battery may be composed of a lithium intercalation cathode material (022) coated on a positive electrode current collector (024) and a lithium intercalation anode material (026), such as graphite, coated on a negative electrode current collector (028). In the event that the polymer electrolyte is a gel polymer electrolyte, a porous separator (016) may be used to separate the positive and negative electrodes.

Figure 3:
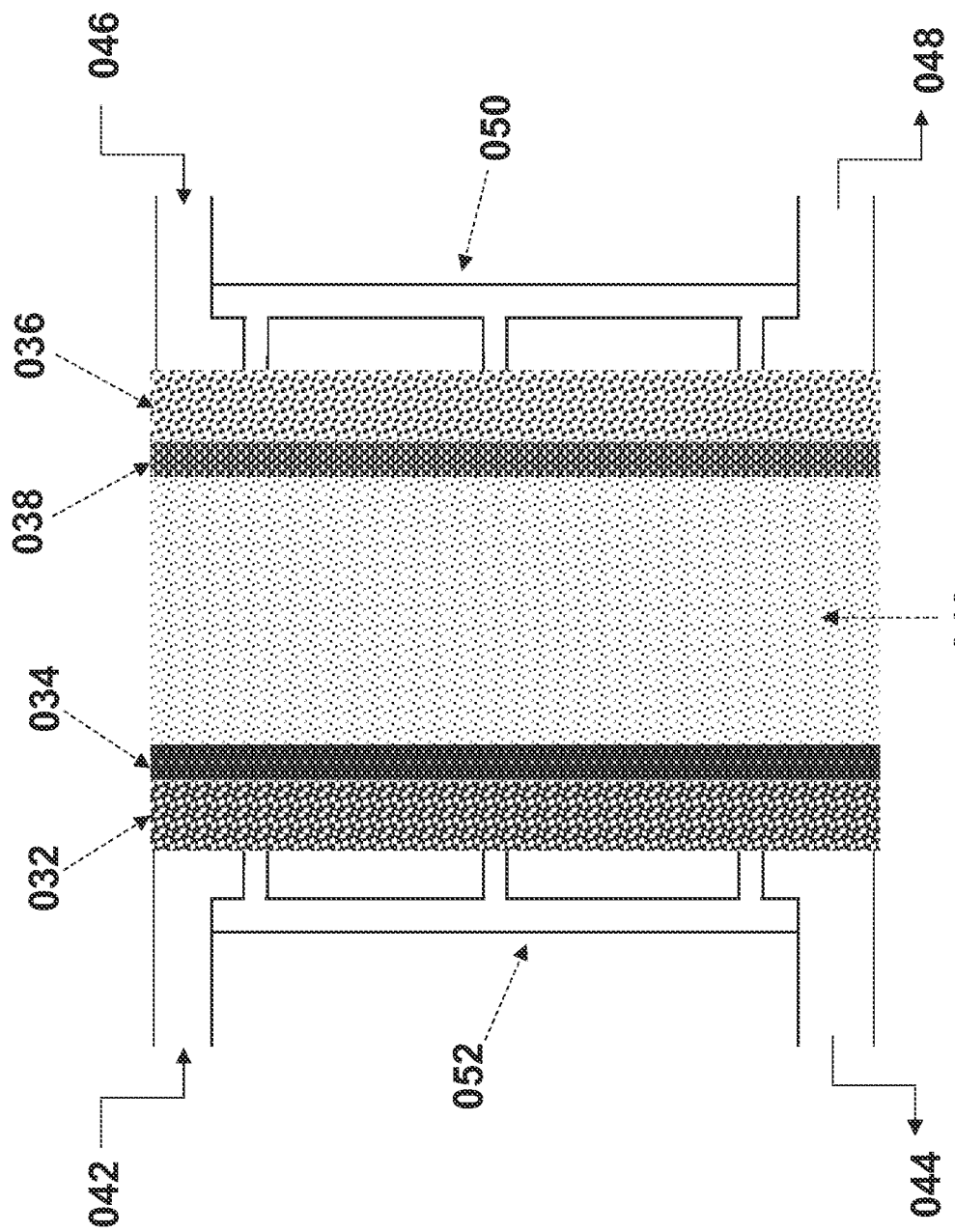
FIG. 3: A schematic illustration of dielectrically heatable materials suspended in the ion exchange electrolyte of a phosphoric acid fuel cell.

FIG. 3: A schematic illustration of dielectrically heatable materials suspended in a fuel cell ion exchange electrolyte. A fuel cell system may include a phosphoric acid fuel cell (PAFC). A PAFC may consist of phosphoric acid as the ion exchange media with dielectrically heatable materials suspended within (040). A PAFC may further consist of a porous fuel cell anode (032), coated with an anode catalyst (034), and a porous fuel cell cathode (036), coated with a cathode catalyst (038), separated by the phosphoric acid. A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Hydrogen gas (042) that is not dissociated may exit the fuel cell as excess hydrogen gas (044). After the reaction of hydrogen gas and oxygen gas at the cathode catalyst, water as a byproduct may exit the fuel cell along with excess oxygen gas (048).

Figure 4:
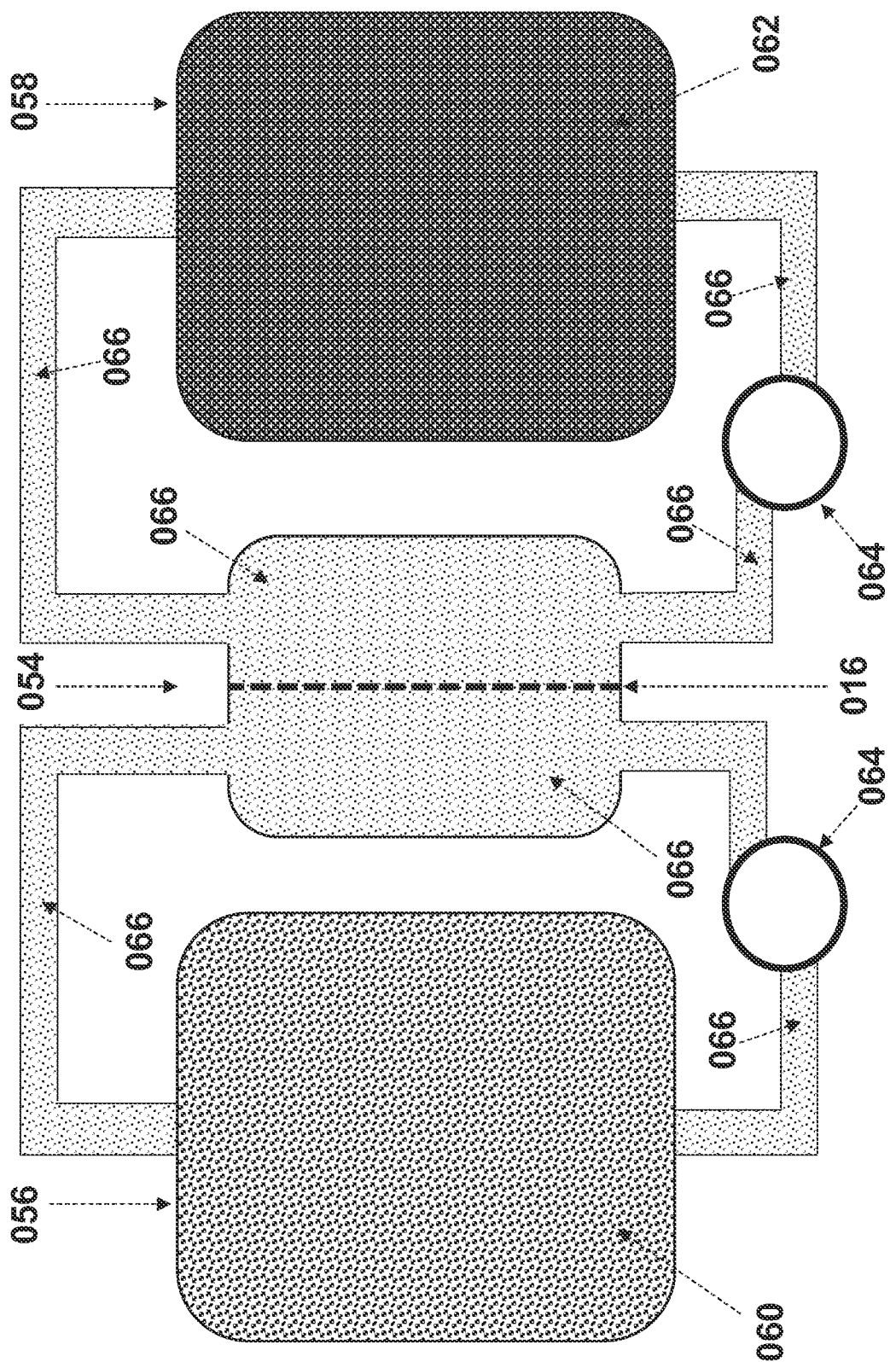
FIG. 4: A schematic illustration of dielectrically heatable materials suspended in the liquid electrolyte of a lithium-based semi-solid flow battery.

FIG. 4: A schematic illustration of dielectrically heatable materials suspended in a flow battery ionic conductive membrane, wherein the flow battery may be further defined as a semi-solid flow battery, and the ionic conductive membrane further defined as lithium-based liquid electrolyte with dielectrically heatable materials suspended within (066). The semi-solid flow battery may consist of a flow battery cell reactor (054), a catholyte tank (056), with a lithium intercalation cathode material (060) positioned within, and an anolyte tank (058), with a lithium intercalation anode material (062) positioned within. A flow battery cell reactor (054) may include a porous separator (016) to allow the lithium-based liquid electrolyte with dielectrically heatable materials suspended within (066) to flow from tank to tank but prevent the intercalation materials (060 and 062) from crossing over. Two pumps (064) may be used on each side of the semi-solid flow battery to push or pump the lithium-based liquid electrolyte with dielectrically heatable materials suspended within (066) through said semi-solid flow battery.

Figure 5:
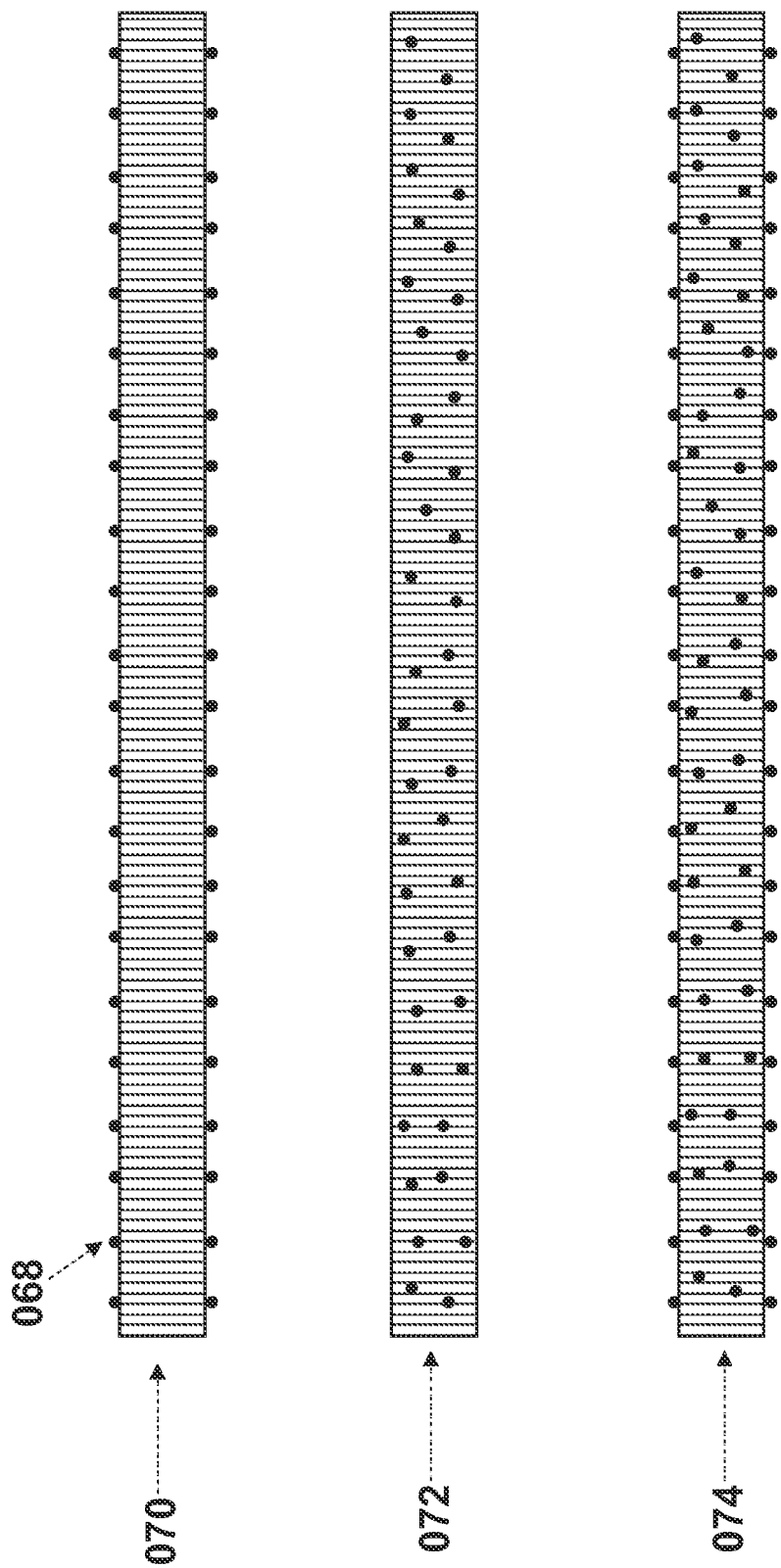
FIG. 5: A schematic illustration of dielectrically heatable materials embedded and/or dispersed on a battery separator.

FIG. 5: A schematic illustration of dielectrically heatable materials embedded or dispersed on to a battery separator. In an instance, dielectrically heatable materials (068) may be dispersed or coated onto a porous separator to form a porous separator with dielectrically heatable materials deposited onto the surface (070). In another instance, dielectrically heatable materials (068) may be embedded within the porous separator, wherein the dielectrically heatable materials (068) may be added to the mixture in the formation of a porous separator, to form a porous separator with dielectrically heatable material embedded within (072). In yet another instance, a porous separator may have dielectrically heatable materials (068) deposited onto the surface and embedded within (074).

FIG. 6: A schematic illustration of a dielectrically heatable wires or fibers embedded in a liquid-based electrochemical cell. An electrochemical cell may include a primary battery such as a Zinc-Carbon battery, wherein the dielectrically heatable materials (090) are suspended or embedded in an ammonium chloride solution (092) and composed of a dielectrically heatable wires or fibers (078) coated with an optional insulative layer (080). The wires or fibers may be viewed cross sectionally (076) or from the planar view (082). The Zinc-Carbon battery may include a manganese dioxide cathode (086) coated on carbon rod current collector (088), and a zinc anode (084) coated onto the container (020), which are separated by porous separator (016) and ammonium chloride solution (092) with dielectrically heatable wires or fibers suspended or embedded within (090).

Figure 7:
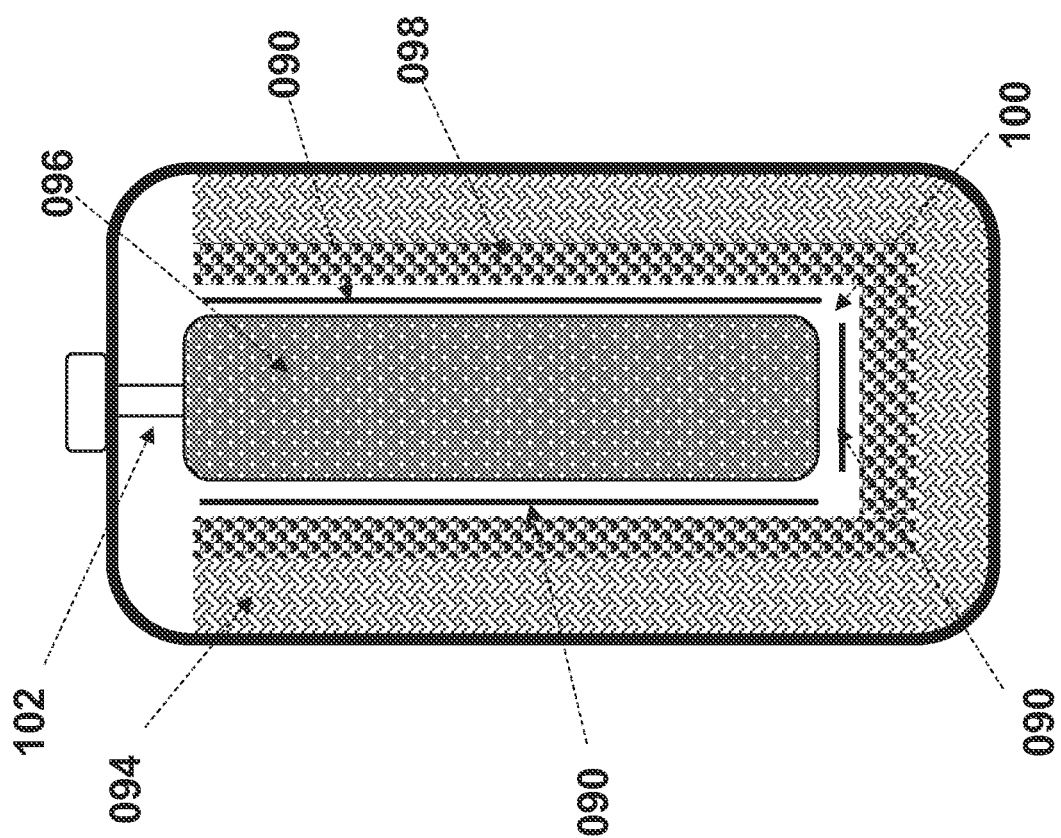
FIG. 7: A schematic illustration of dielectrically heatable wires or fibers embedded in a solid-state electrochemical cell such as a molten-salt battery or Zebra battery wherein it is in a solid state at room temperature, but in a molten state at elevated temperatures.

FIG. 7: A schematic illustration of dielectrically heatable wires or fibers embedded in a solid-state electrochemical cell. An electrochemical cell may include a molten battery such as a sodium-nickel chloride or Zebra battery that is solid at room temperature but molten at elevated temperatures. At elevated temperatures, a Zebra battery may include a molten sodium anode (094), a nickel cathode (096) coated on a current collector (102), which are separated by a ceramic beta alumina (098) layer and a molten sodium tetrachloroaluminate (100). The wires or fibers (90) may be posited onto the surface of beta alumina (098), embedded in the beta alumina (098), or suspend in the molten sodium tetrachloroaluminate (100).

Figure 8:
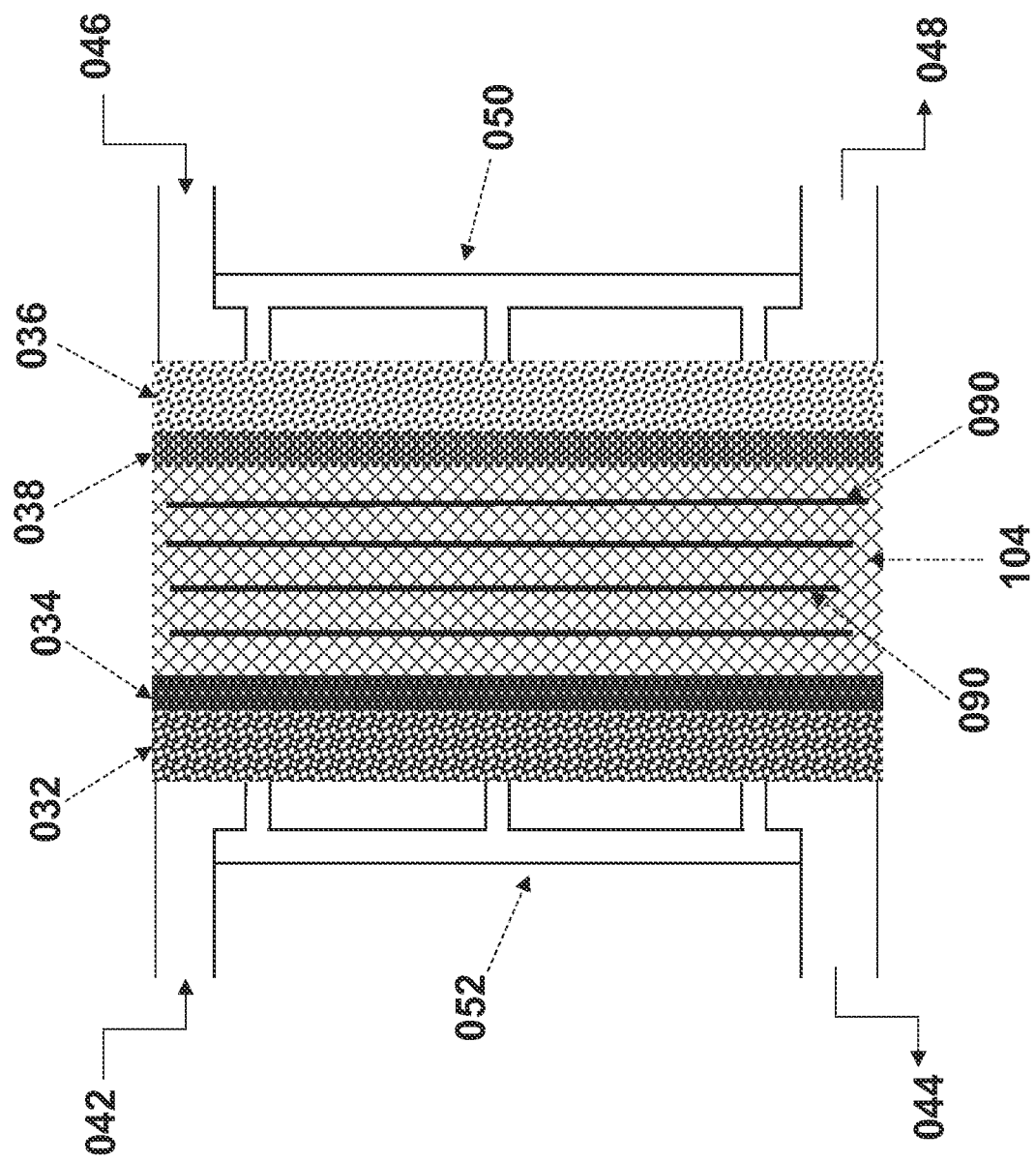
FIG. 8: A schematic illustration of dielectrically heatable wires or fibers embedded in the ion conducting membrane of a proton exchange membrane fuel cell.

FIG. 8: A schematic illustration of dielectrically heatable wires or fibers embedded in a fuel cell proton exchange membrane, wherein the fuel cell is a proton exchange membrane fuel cell or PEMFC, wherein the proton exchange membrane (104) is composed of Nafion with dielectrically heatable wires or fibers embedded (090) within. A PEMFC may be may further consist of a porous fuel cell anode (032), coated with an anode catalyst (034), and a porous fuel cell cathode (036), coated with a cathode catalyst (038), separated by Nafion. A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Hydrogen gas (042) that is not dissociated may exit the fuel cell as excess hydrogen gas (044). After the reaction of hydrogen gas and oxygen gas at the cathode catalyst, water as a byproduct may exit the fuel cell along with excess oxygen gas (048).

Figure 9:
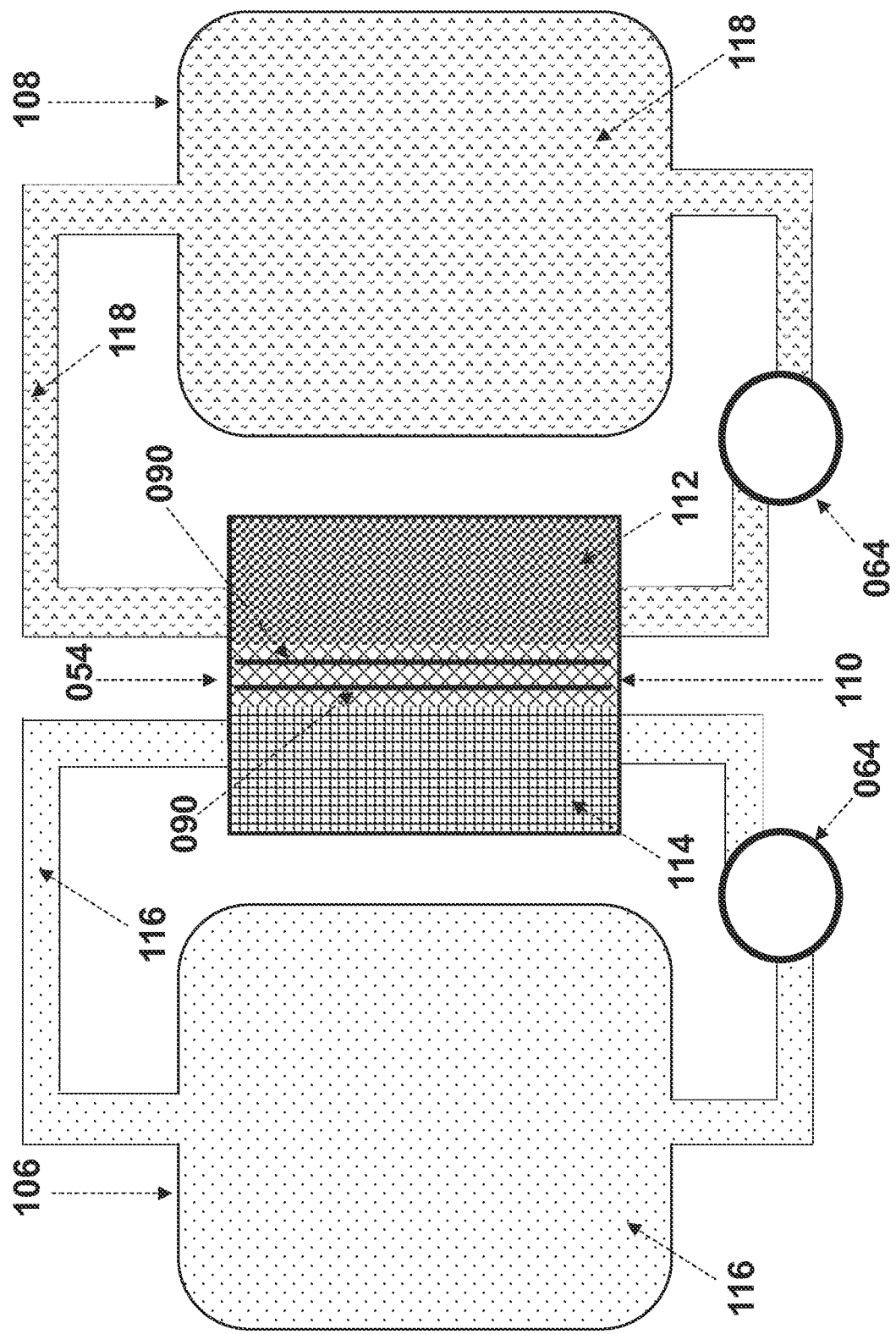
FIG. 9: A schematic illustration of dielectrically heatable wires or fibers embedded in ionic conductive membrane of a redox-type flow battery.

FIG. 9: A schematic illustration of a dielectrically heatable fiber or wire embedded in a flow battery ionic conductive membrane, wherein the flow battery may be further defined as redox flow battery, and the ionic conductive membrane further defined as an ion selective membrane (110) with dielectrically heatable wires or fibers embedded within (090). A redox flow battery may consist of a flow battery cell reactor (054) which houses a porous cathode (114) on the catholyte side, a porous anode (112) on the anolyte side, separated by an ion selective membrane (110) with dielectrically heatable wires or fibers embedded within (090) that is used to prevent the mixing of the catholyte (116) and anolyte (118). A redox flow battery may further consist of a catholyte tank (106), which is used to store the catholyte (116), and an anolyte tank (108), which is used to store the analyte (118). A pump (064) may be used to push or pump the catholyte (116) through the redox flow battery and into the cell reactor. A second pump (064) may be used to push or pump the anolyte (118) through the redox flow battery and into the cell reactor.

Figure 10:
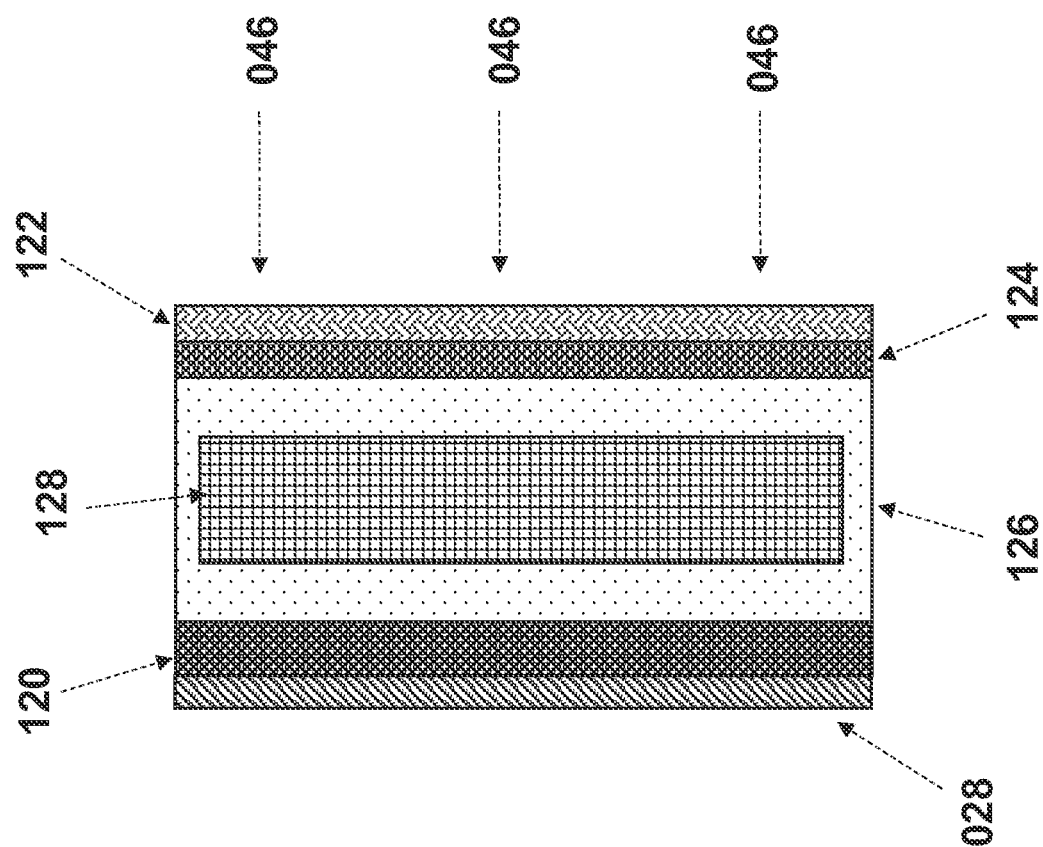
FIG. 10: A schematic illustration of a dielectrically heatable mesh embedded in the liquid electrolyte of a lithium-air battery.

FIG. 10: A schematic illustration of a dielectrically heatable mesh embedded in a liquid-based electrochemical cell. An electrochemical cell may include a lithium-air battery wherein air or oxygen gas (046) is used as an oxidizing agent. A lithium-air battery may be composed of a porous air-battery cathode (122), with a catalyst (124) coated on top, and a lithium metal anode (120), coated onto a negative electrode current collector (028), which are separated by a lithium-based liquid electrolyte (126), with a dielectrically heatable mesh (128) embedded within.

Figure 11:
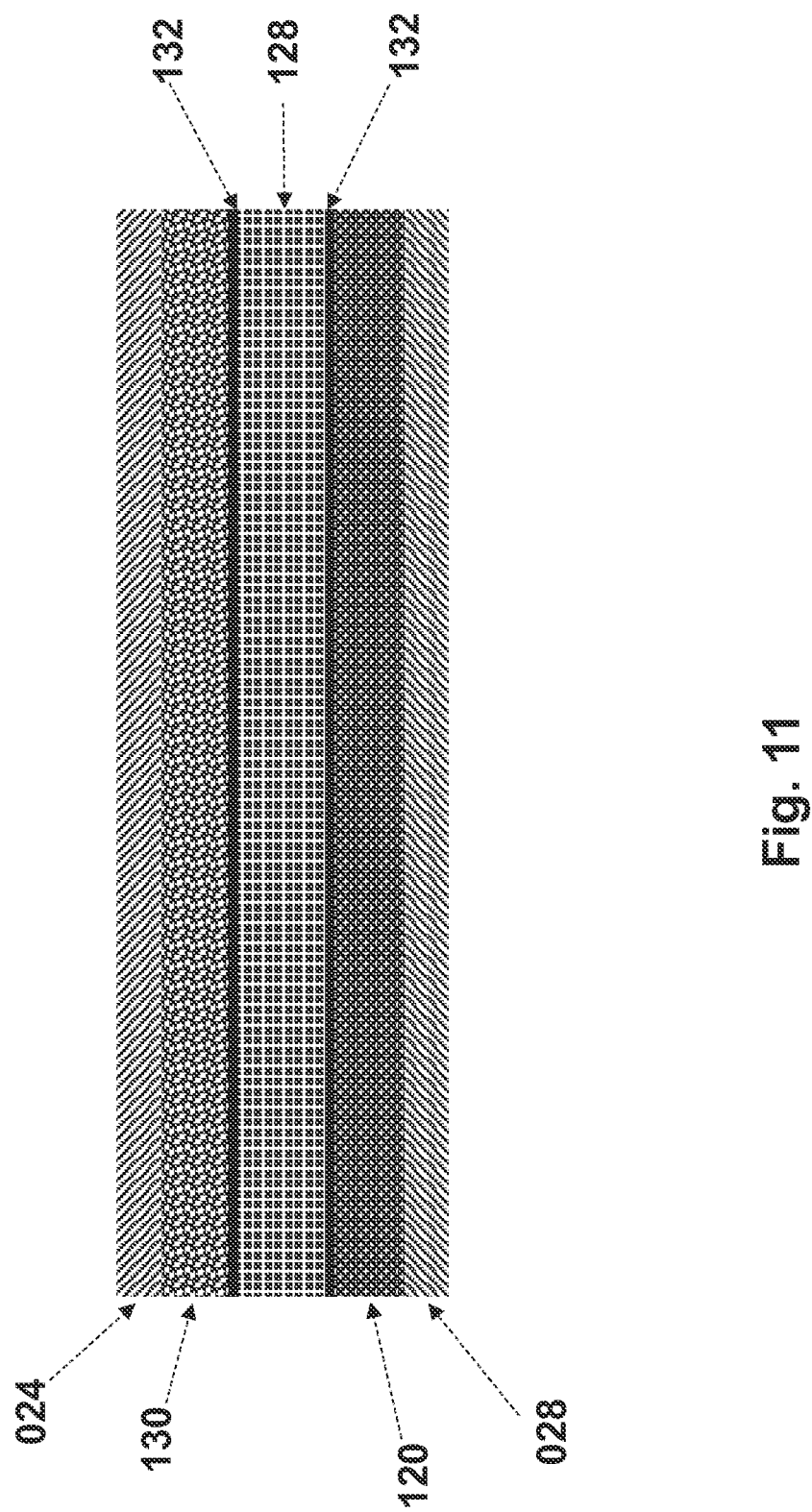
FIG. 11: A schematic illustration of a dielectrically heatable mesh embedded in the ceramic-polymer composite electrolyte of a solid-state lithium metal battery.

FIG. 11: A schematic illustration of a dielectrically heatable mesh embedded in a solid-state electrochemical cell. An electrochemical cell may include a metal-based secondary battery with a ceramic-polymer composite electrolyte (132), wherein the metal-based secondary battery is a solid-state lithium metal battery. A metal-based battery may consist of a composite cathode (130), coated on a positive electrode current collector (024), and a metal anode such as lithium metal (120), coated on a negative electrode current collector (028), separated by a ceramic-polymer composite electrolyte (132) embedded in a dielectrically heatable mesh (128). In this instance, the ceramic-polymer composite electrolyte (132) is assumed to be embedded in the pores of the heatable mesh (128), and vice versa the dielectrically heatable mesh embedded in the ceramic-polymer composite electrolyte (132) matrix. In such an instance, it is further assumed that the ceramic-polymer composite electrolyte (132) is coated onto and pressed into the heatable mesh which may be coated with an optional insulating layer.

Figure 12:
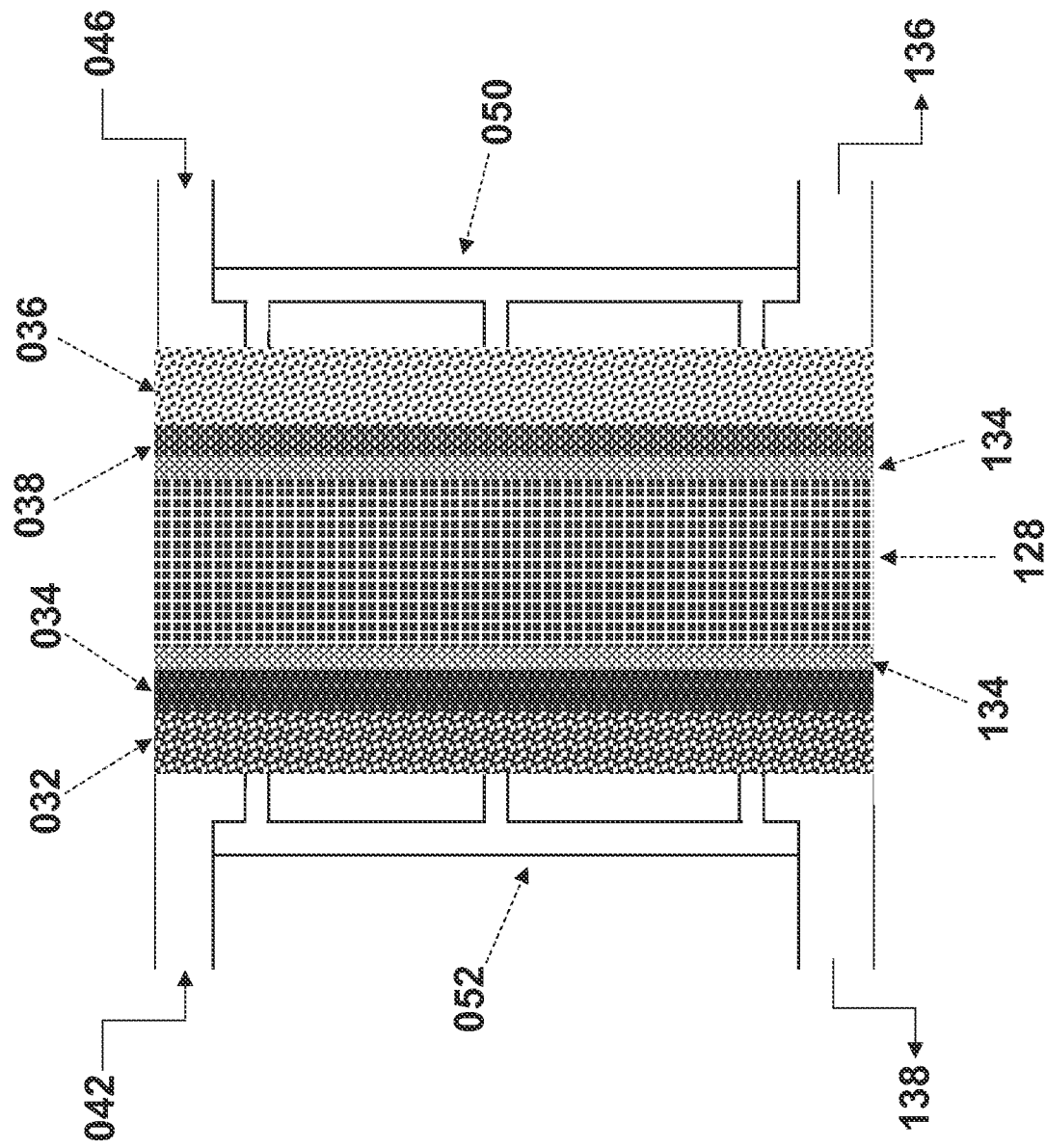
FIG. 12: A schematic illustration of a dielectrically heatable mesh embedded in the ceramic ionic conducting membrane of a solid oxide fuel cell.

FIG. 12: A schematic illustration of a dielectrically heatable mesh embedded in a fuel cell ion conducting membrane, wherein the fuel cell is a solid oxide fuel cell (SOFC) and the ion conducting membrane is ceramic yttria-stabilized zirconia (134) with a dielectrically heatable mesh (128) embedded within. A SOFC may further consist of a porous fuel cell anode (032), coated with an anode catalyst (034), and a porous fuel cell cathode (036), coated with a cathode catalyst (038), separated by yttria-stabilized zirconia (134). A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Oxygen gas (046) that is not dissociated may exit the fuel cell as excess oxygen gas (136). After the reaction of oxygen gas and hydrogen gas at the anode catalyst, water as a byproduct may exit the fuel cell along with excess hydrogen gas (138).

Figure 13:
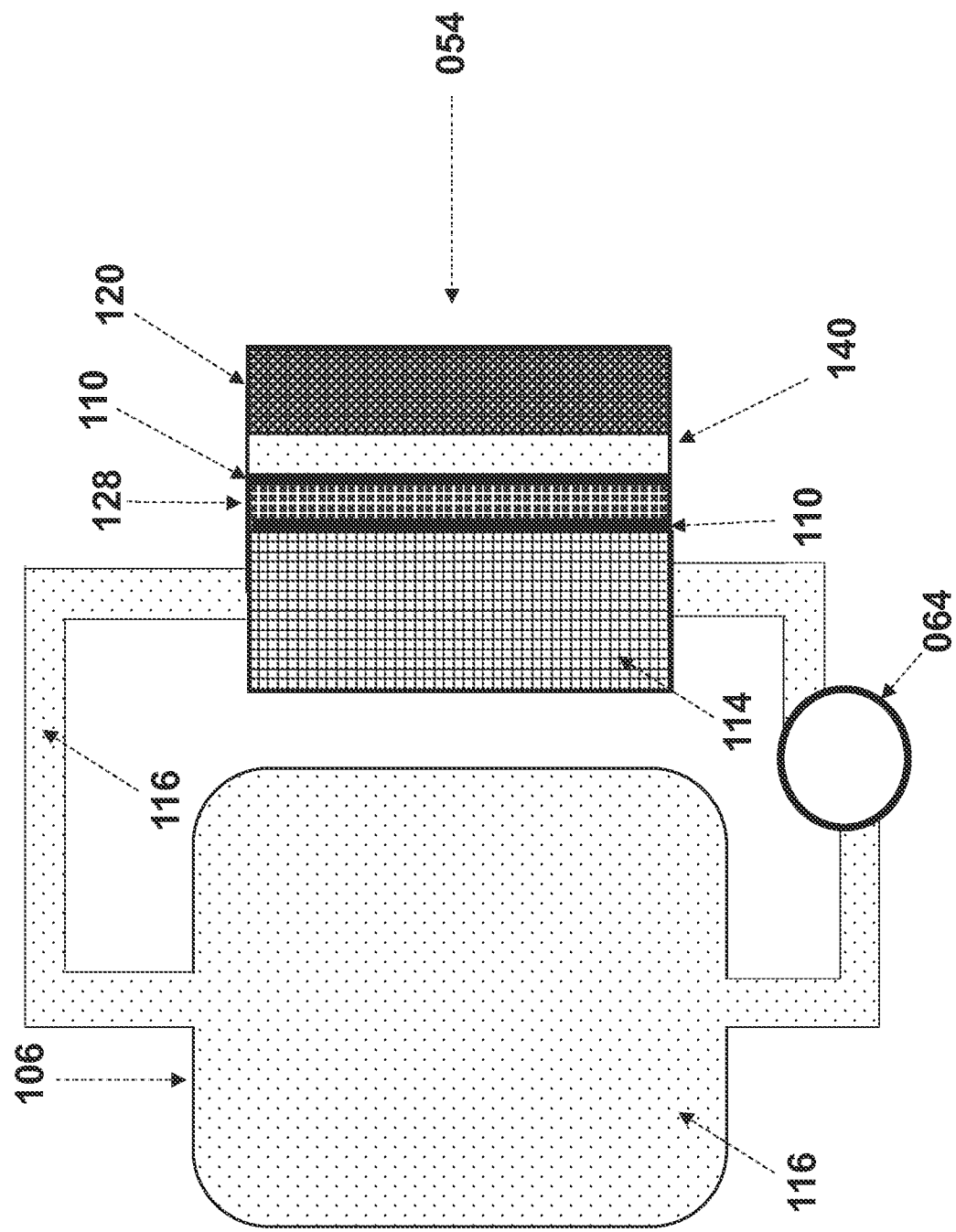
FIG. 13: A schematic illustration of a dielectrically heatable mesh embedded in the ionic conductive membrane of a hybrid type flow battery.

FIG. 13: A schematic illustration of a dielectrically heatable mesh embedded in a flow battery ionic conductive membrane, wherein the flow battery is a hybrid flow battery. A hybrid flow battery may be comprised of a catholyte tank (106), which is used to store the catholyte (116), and a flow battery reactor cell (054). A flow battery reactor cell (054) may be composed of a porous cathode (114) and a lithium metal anode (120), which are separated by an ionic conducting membrane (110) with a dielectrically heatable mesh (128) embedded within. An ion conducting solution (140) may be used between the ionic conducting membrane (110) and lithium metal (120) as an ion conducting media in order to facilitate ion conduction on the anolyte side of the flow battery. A pump (064) may be used to push or pump the catholyte (116) from the catholyte tank (106) to the reactor cell (054) and vice versa.

Figure 14:
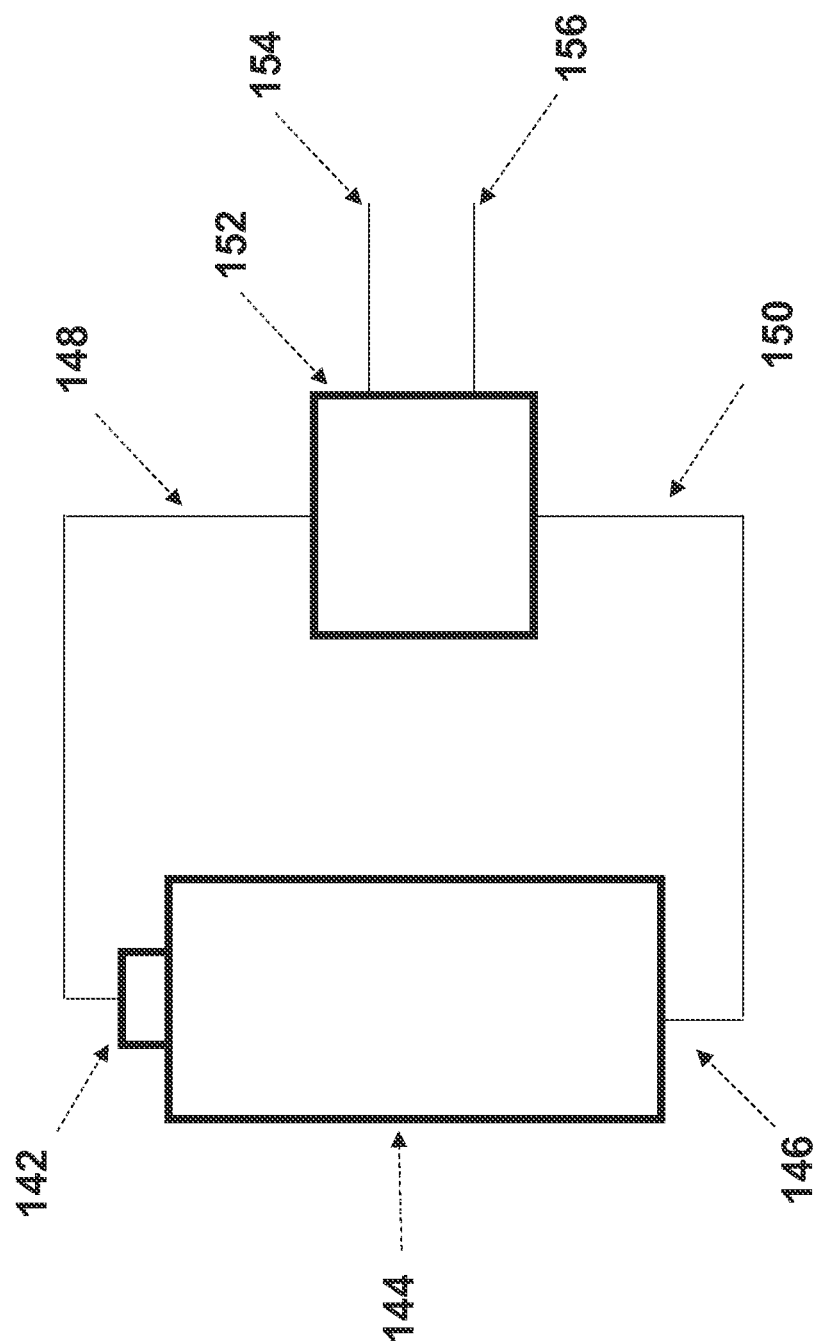
FIG. 14: A schematic illustration of a dielectric heating system, wherein the electromagnetic wave generator is positioned within the primary electrical circuit.

FIG. 14: A schematic illustration of a dielectric heating system, wherein the electromagnetic wave generator is positioned within the primary electrical circuit. A primary electrical circuit consists of an electrochemical cell (144), such as a secondary battery, in electrical connection with the electromagnetic wave generator (152) through the positive primary electrical circuit (148) and negative primary electrical circuit (150). The positive primary electric circuit (148) is connected to the electrochemical cell (144) through the primary positive terminal (142) of said electrochemical cell. The negative primary electric circuit (150) is connected to the electrochemical cell (144) through the primary negative terminal (146) of said electrochemical cell. The electromagnetic generator (152) has a positive electrical lead (154), and a negative electrical lead (156), leading out of the electrochemical system to the application or load.

Figure 15:
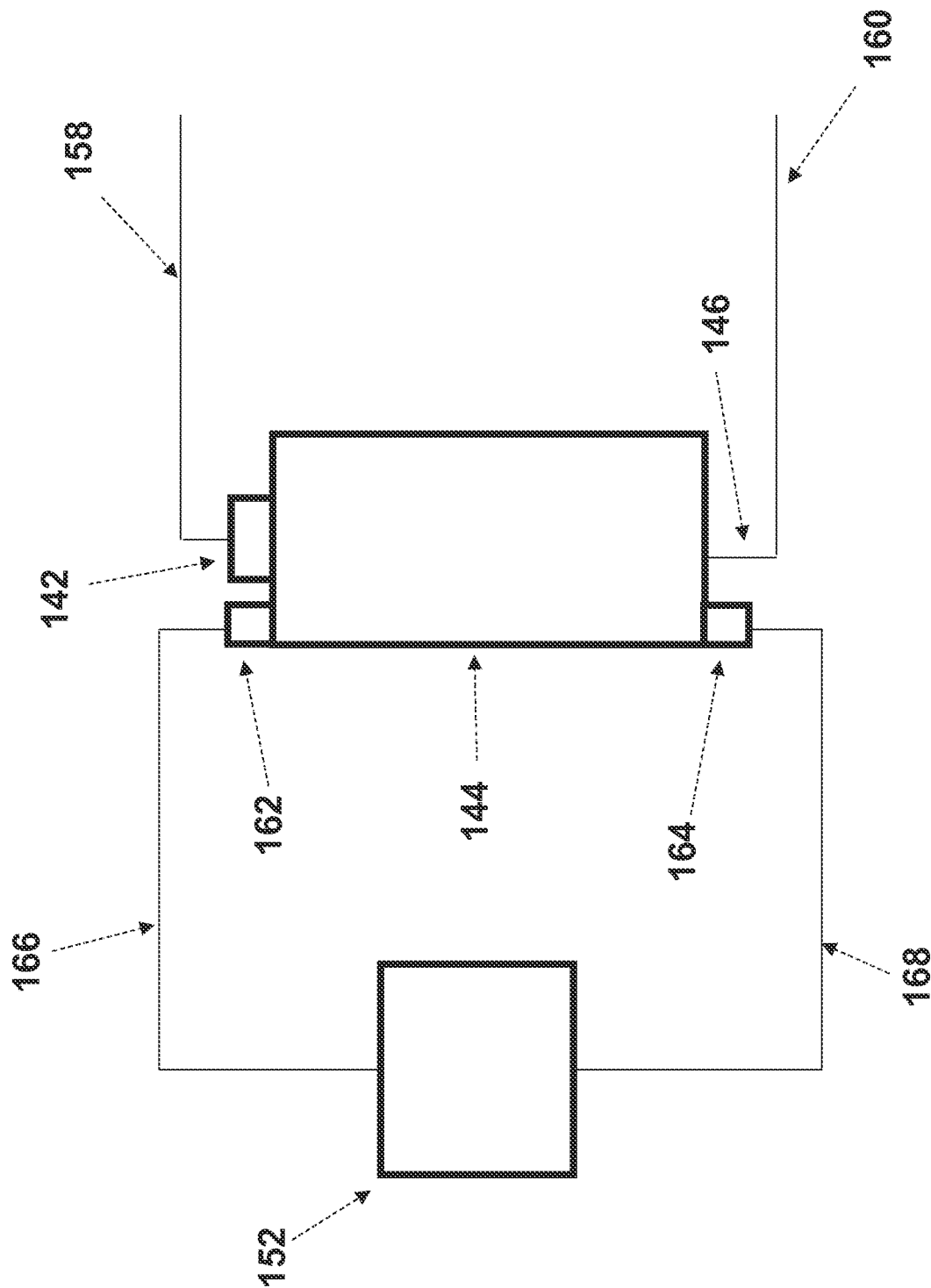
FIG. 15: A schematic illustration of a dielectric heating system, wherein the electromagnetic wave generator is positioned within a secondary electrical circuit.

FIG. 15: A schematic illustration of a dielectric heating system, wherein the electromagnetic wave generator is positioned within a secondary electrical circuit. A primary electrical circuit consists of an electrochemical cell (144), such as a secondary battery, a positive primary electrical circuit (158), connected to the electrochemical cell (144) through the primary positive terminal (142) of said electrochemical cell, and leading out of the electrochemical system to a load or application, and a negative primary electrical circuit (160) connected to the electrochemical cell (144) through the primary negative terminal (146) of said electrochemical cell, and leading out of the electrochemical system to a load or application. A secondary electric circuit consists of the same electrochemical cell (144), such as a secondary battery, a positive secondary electrical circuit (166), connecting said electrochemical cell (144) to the electromagnetic wave generator (152) through its secondary positive terminal (162), and a negative secondary electrical secondary electrical circuit (168), connecting said electrochemical cell (144) to the electromagnetic wave generator (152) through its secondary negative terminal (164).

With reference to the drawings, examples of electrochemical energy storage systems with dielectrically heatable materials embedded or suspended in the electrolyte may include the following.

Example 1: In an example, dielectrically heatable materials may be suspended in the liquid electrolyte of a primary battery cell. A primary battery cell may include, for example, an Alkaline battery, wherein the dielectrically heatable materials are suspended in a potassium hydroxide solution and composed of a dielectrically heatable material coated with an optional insulative layer and enclosed within a surfactant. The alkaline battery may include a zinc powder/gel anode coated on an anode current collector and a manganese dioxide/carbon paste cathode coated onto the container, which are separated by porous separator and potassium hydroxide solution with dielectrically heatable materials suspended within.

An alternative example may include, for example, silver oxide primary battery cells with dielectrically heatable materials supported in a sodium hydroxide solution separating an amalgamated zinc gel anode and silver oxide paste cathode.

An alternative example may include, for example, lithium primary battery cells where the dielectrically heatable materials are suspended in an organic solution positioned between a lithium metal anode and a variety of cathodes depending on the type of lithium battery.

Example 2: In an example, dielectrically heatable materials may be suspended in the liquid electrolyte of a secondary battery cell. A secondary battery cell may include, for example, a lead acid battery wherein the dielectrically heatable materials are suspended in a solution of sulfuric acid and composed of a dielectrically heatable material coated with an optional insulative layer and enclosed within a surfactant. The lead acid cell may contain one lead plate and one lead oxide plate when in the charged state.

An alternative example may include, for example, a secondary Lithium-ion battery cell wherein the dielectrically heatable materials are suspended in an organic solution positioned between a lithium intercalation cathode, such as $LiCoO_2$, and a lithium intercalation anode, such as graphite.

Yet another example may include, for example, a secondary Nickel-metal hydride battery cell wherein the dielectrically heatable materials are suspended in a potassium hydroxide solution between a nickel oxide hydroxide cathode and a hydrogen absorbing alloy in the $AB_5$, in other instances an $AB_2$ group.

Example 3: In an example, dielectrically heatable materials may be deposited onto, embedded within, or in some instances embedded within and deposited onto a porous battery separator. A porous battery separator may include, for example, a glass mat for a lead acid battery. An alternative example may include, for example, a polypropylene separator for primary lithium batteries. Yet another example may include, for example, polyolefin in secondary lithium ion batteries.

Example 4: In an example, dielectrically heatable materials may be suspended in the liquid electrolyte of an electrochemical capacitor. An example of an electrochemical capacitor may include, for example, an electric double layer capacitor wherein the dielectrically heatable materials are suspended in a potassium chloride solution between positive and negative electrodes composed of activated carbon.

An alternative example may include, for example, pseudocapacitors where the dielectrically heatable materials are suspended in a sulfuric acid solution, wherein the positive and negative electrodes are metal oxide such as ruthenium oxide, or in some cases a metal oxide such as ruthenium oxide anchored onto a carbon structure. Alternatively, the positive and negative electrodes may be an electrically conducting polymer such as, for example, poly (3,4-ethylenedioxythiophene).

In yet another example may include, for example, asymmetric supercapacitors where the dielectrically heatable materials are suspended in a lithium hydroxide solution, wherein the negative electrode is a carbon material such as activated carbon, and the positive electrode is a metal oxide, such as cobalt molybdate ($CoMoO_4$).

Example 5: In an example, dielectrically heatable materials may be suspended in the matrix of a solid polymer in an ion-based battery. An example of an ion-based battery may include, for example, a lithium polymer battery, wherein the dielectrically heatable materials are suspended in a poly(ethylene oxide) (PEO) matrix between a lithium intercalation anode, such as graphite, and a lithium intercalation cathode, such as lithium iron phosphate ($LiFePO_4$).

Example 6: In an example, dielectrically heatable materials may be suspended in a gel polymer electrolyte, wherein the dielectrically heatable materials are suspended in a solid polymer, such as, for example, polyacrylonitrile, and an organic liquid electrolyte, such as, for example, ethylene carbonate with one molar of lithium hexafluorophosphate. The gel polymer may be used in a lithium-ion battery composed of, for example, an intercalation cathode, such as $LiNi_xCo_yMn_zO_2$, and an intercalation anode, such as graphite composed of 10-15% silicon particles by weight.

Example 7: In an example, dielectrically heatable materials may be suspending in an ionic conducting solution, wherein the ionic conducting solution serves as the ionic conducting media for a fuel cell. A fuel cell may include, for example, a phosphoric acid fuel cell (PAFC), wherein the dielectrically heatable materials are suspended in phosphoric acid. A PAFC may be composed of porous carbon paper as the electrodes, wherein platinum is used as the catalyst on the anode side, and nickel as the catalyst on the cathode side. The dielectrically heatable materials may be used to increase the ionic conductivity of the phosphoric acid in cold weather. In addition, the dielectrically heatable materials may be used to maintain the high temperature of the PAFC in the preferred temperate range of 150 to 200 degrees Celsius. In addition, the dielectrically heatable materials may be used to lower the startup time of the PAFC.

An alternative example may include, for example, an alkaline fuel cell (AFC), wherein the dielectrically heatable materials are suspended in a concentrated solution of sodium hydroxide, or in some cases potassium hydroxide. The AFC, also referred to as a hydrogen-oxygen fuel cell, may be composed of porous carbon materials as the electrodes, wherein platinum is used as the catalyst on the anode side, and nickel as the catalyst on the cathode side. The dielectrically heatable materials may be used to increase the ionic conductivity of the concentrated sodium hydroxide solution in cold weather. In addition, the dielectrically heatable materials may be used to maintain the operating temperature of the AFC in the preferred temperate range of 70 to 140 degrees Celsius. In addition, the dielectrically heatable materials may be used to lower the startup time of the AFC.

Example 8: In an example, dielectrically heatable materials may be suspended in the ionic conducting media of a flow battery, wherein the flow battery may be a semi-solid flow battery. The dielectrically heatable materials may be suspended in the liquid electrolyte of a semi-solid flow battery. An example of a semi-solid flow battery may include, for example, a lithium-based solid dispersion flow battery, wherein lithium intercalation materials are suspended in the ionic conduction solution which may be organic based consisting of ethylene carbonate and lithium hexafluorophosphate. The lithium intercalation materials may include lithium iron phosphate ($LiFePO_4$) on the catholyte side, and graphite on the analyte side. A porous separate may be positioned inside the flow battery cell reactor to prevent mixing of the intercalation materials, but allow ions, electrolyte, and the suspended dielectrically heatable materials to flow through.

An alternative example of a semi-solid flow battery may include, for example, a redox targeting flow battery, wherein the dielectrically heatable materials are suspended in the liquid electrolyte, but the intercalation materials are fixed in the catholyte and anolyte tanks. The catholyte tank may contain lithium iron phosphate ($LiFePO_4$) fixed within, while the analyte tank may contain graphite fixed within.

Example 9: In an example, dielectrically heatable wires or fibers, coated with a thin optional insulating layer, may be embedded, or suspended in the liquid electrolyte of a primary battery. A primary battery may include, for example, a Zinc-carbon battery, wherein the dielectrically heatable wires or fibers are suspended in an ammonium chloride solution serving as the electrolyte, separating a manganese dioxide cathode, coated on a carbon rod current collector, and metallic zinc serving as both the anode and container.

An alternative example of a primary battery may include, for example, a Zinc-chloride battery, wherein the dielectrically heatable wires, or fibers are embedded or suspend in a zinc chloride solution separating a manganese dioxide cathode, coated on a carbon rod current collector, and metallic zinc serving as both the anode and container.

Example 10: In an example, dielectrically heatable wires or fibers may be embedded in the electrolyte of a molten-salt battery. A molten-salt battery may include, for example, a sodium-nickel chloride or Zebra battery, wherein the electrolyte is a solid at room temperature but molten at elevated temperatures. At elevated temperatures, a Zebra battery may include a molten sodium anode, a nickel cathode coated on a current collector, which are separated by a ceramic beta alumina layer separator layer and a molten sodium tetrachloroaluminate. The dielectrically heatable wires, or fibers may be posited onto the surface of beta alumina. Alternatively, the dielectrically heatable wires, or fiber may be embedded in the beta alumina. In yet another alternative, the dielectrically heatable wires, or fibers may be suspended in the molten sodium tetrachloroaluminate. The dielectrically heatable wires, or fibers may be used to increase the ionic conductivity of the beta alumina and or the molten sodium tetrachloroaluminate in cold weather. In addition, the dielectrically heatable wires, or fibers may be used to molten the sodium tetrachloroaluminate, and as an indirect result molt the sodium anode. In addition, the dielectrically heatable wires, or fibers, may be used to maintain the operating temperature of a Zebra battery in the preferred temperate range of 225 to 350 degrees Celsius. In addition, the dielectrically heatable wires, or fibers may be used to lower or reduce the startup time of a Zebra battery in cold weather or enabling it to remain at room temperature when not in use.

An alternative example of a molten-salt battery may include, for example, a sodium-sulfur battery, wherein at elevated temperatures, and during operation, is composed of a molten sodium anode and a molten sulfur cathode. The cathode and anode are separated by a ceramic layer of beta alumina, typically in tubular form, serving as the separator and solid-state electrolyte. Dielectrically heatable wires, or fibers may be positioned on to the inner surface of the tubular beta alumina. Alternatively, the dielectrically heatable wires, or fibers may be position on to the outer surface of the tubular beta alumina, or in some instances on both surface. In yet another alternative, the dielectrically heatable wires, or fibers may be embedded in the beta alumina. The dielectrically heatable wires, or fibers may be used to increase the ionic conductivity of the beta alumina in cold weather. In addition, the dielectrically heatable wires, or fibers may be used to molten the electrodes of sodium-sulfur battery. In addition, the dielectrically heatable wires, or fibers, may be used to maintain the operating temperature of a sodium-sulfur battery in the preferred temperate range of 225 to 350 degrees Celsius. In addition, the dielectrically heatable wires, or fibers may be used to lower or reduce the startup time of a sodium-sulfur battery in cold weather or enabling it to remain at room temperature when not in use.

Example 11: In an example, dielectrically heatable wires or fibers may be embedded in the ceramic-polymer composite electrolyte of a metal-based secondary battery. A metal-based secondary battery may include, for example, a solid-state lithium metal battery. A ceramic-polymer composite may be composed of garnet-structure lithium lanthanum zirconium oxide and poly(ethylene oxide) (PEO). A solid-state lithium metal battery may further be composed of metallic lithium as the anode and a composite cathode formulated with $LiNi_xCo_yMn_zO_2$ and PEO. In some instances, a lithium metal battery may consist of an organic liquid electrolyte, in addition to the ceramic-polymer composite, such as dimethyl carbonate with one molar of lithium hexafluorophosphate, which may be termed a semi-solid-state or hybrid lithium metal battery.

Example 12: In an example, dielectrically heatable wires or fibers may be embedded in the ion conducting media of a fuel cell. An ion conducting media may include, for example, a proton exchange membrane, for example Nafion, in a proton exchange membrane fuel cell (PEMFC). A PEMFC may be composed of porous carbon paper as the electrodes, wherein platinum is used as the catalyst on the anode side, and nickel as the catalyst on the cathode side. The dielectrically heatable wires, or fibers may be used to increase the ionic conductivity of Nafion in cold weather. In addition, the dielectrically heatable materials may be used to maintain the temperature of the PEMFC in the preferred temperate range of 50 to 100 degrees Celsius. In addition, the dielectrically heatable materials may be used to lower the startup time of the PEMFC in cold weather.

An alternative example may include, for example, a solid acid fuel cell (SAFC), wherein the dielectrically heatable wires, or fibers are embedded in the solid acid electrolyte of a SAFC. A solid acid electrolyte may include, for example, cesium hydrogen sulfate ($CsHSO_4$) or cesium dihydrogen phosphate ($CsH_2PO_4$). The dielectrically heatable wires, or fibers may be used to facilitate a phase transition of the solid acid electrolyte, wherein it becomes a highly disordered superprotonic structure with an increased ionic conductivity. In addition, the dielectrically heatable wires, or fibers, may be used to maintain an operating temperature of a SAFC in the preferred range of 100 to 200 degrees Celsius. In addition, the dielectrically heatable wires, or fibers, may be used to reduce the startup time of an SAFC, particularly in cold weather.

Example 13: In an example, dielectrically heatable wires or fibers may be embedded in the ion selective membrane of a redox-type flow battery. A redox type flow battery may include, for example, a vanadium redox flow battery, wherein ion selective membrane is composed of Nafion. A vanadium redox flow battery may be described as a flow battery with a reactor cell composed of a porous cathode, such as carbon paper, on the catholyte side, and a porous anode, such as carbon cloth on the catholyte side, separated by the Nafion. The anolyte and catholyte may be aqueous in nature and formed by the dissolving vanadium pentoxide ($V_2O_5$) in sulfuric acid; wherein the anolyte is in an oxidation state of $V^{3+} \leftrightarrow V^{2+}$, and the catholyte is in the oxidation state of $V^{5+} \leftrightarrow V^{4+}$. The dielectrically heatable wires, or fibers may be embedded within the Nafion. Alternatively, the dielectrically heatable wires, or fibers may be formed on the surface of the Nafion. In yet another alternative, the dielectrically heatable wires, or fibers may be embedded in the Nafion and on the surface of Nafion. The dielectrically heatable wires, of fibers may be used to increase the ionic or vanadium conductivity of the Nafion in cold weather. The dielectrically heatable wires, or fibers may be used increase the operating temperature of the vanadium redox flow battery up to 60 degrees Celsius.

Example 14: In an example, a dielectrically heatable mesh may be embedded in the liquid electrolyte of a primary battery, wherein the primary battery may include, for example, a Zinc-air battery. A Zinc-air batteries may contain a zinc metal anode and a porous carbon cathode containing a catalyst, such as cobalt oxide, wherein the liquid electrolyte is an alkali metal hydroxide solution such as potassium hydroxide. A dielectrically heatable mesh may be positioned inside the potassium hydroxide to increase the ionic conductivity of zinc ions in cold weather.

An alternative example of a primary battery may include, for example, an aluminum-air battery. An aluminum-air battery may be composed of an aluminum metal anode and a porous carbon cathode, supported on a nickel grid, containing a catalyst, such as cobalt oxide, wherein the liquid electrolyte is an alkali metal hydroxide solution such as potassium hydroxide. Alternatively, seawater may be used as an electrolyte in some instances. A porous hydrophobic layer of polytetrafluoroethylene (PTFE) may be coated onto the cathode. A dielectrically heatable mesh may be positioned inside the potassium hydroxide, or in some cases seawater, to increase the ionic conductivity of aluminum ions in cold weather.

Example 15: In an example, a dielectrically heatable mesh may be embedded in the electrolyte of a secondary battery, wherein the secondary battery may include, for example, a lithium-air battery. A lithium air battery may be composed of a lithium metal anode, a mesoporous carbon coated on a nickel grid with a platinum catalyst coated on the surface, and an organic or aprotic electrolyte. An aprotic electrolyte may include, for example, an ethylene carbonate/propylene carbonate mixture with lithium hexafluoroarsenate(V) (Li-$AsF_6$) as the ionic conducting salt. A dielectrically heatable mesh may be positioned inside the organic electrolyte to increase the ionic conductivity of lithium ions in cold weather.

Example 16: In an example, a dielectrically heatable mesh may be embedded in the ceramic-polymer composite electrolyte of a metal-based secondary battery. A metal-based secondary battery may include, for example, a solid-state lithium metal battery. A ceramic-polymer composite may be composed of NASICON-structured LAGP ($Li_1$-$xAl_xGe_{2-x}$($PO_4$)$_3$) and poly(ethylene oxide) (PEO). A solid-state lithium metal battery may further be composed of metallic lithium as the anode and a composite cathode formulated with lithium nickel cobalt aluminum oxide ($LiNi_xCo_yAl_zO_2$) and PEO. In some instances, a lithium metal battery may consist of an organic liquid electrolyte, in addition to the ceramic-polymer composite, such as propylene carbonate with one molar of lithium hexafluorophosphate, which may be termed a semi-solid-state or hybrid lithium metal battery. The dielectrically heatable mesh may be used to increase the ionic conductivity of the ceramic-polymer composite in cold weather. In some instances, the ceramic-polymer composite may be described as being embedded within the dielectrically heatable mesh, wherein all components form the ceramic-polymer composite solid-state electrolyte.

Example 17: In an example, a dielectrically heatable mesh may be embedded in the ionic conducting membrane of a fuel cell; wherein the fuel cell is a high temperature solid oxide fuel cell (SOFC). The oxygen ion conducting membrane may be composed of, for example, ceramic yttria-stabilized zirconia (YSZ) or cerium gadolinium oxide (CGO), wherein the dielectrically heatable mesh is a high temperature material capable of being integrated into the ceramic material during its formation, such as silicon carbide. The ionic conducting ceramic may have the shape of, for example, planar, non-planar, rolled, rod, tubular, etc. A SOFC may be composed of porous electrodes, wherein platinum is used as the catalyst on the anode side, and nickel as the catalyst on the cathode side. The dielectrically heatable mesh may be used to heat up and maintain the operating temperature of a SOFC in the preferred temperature range of 800 to 1000 degrees Celsius, to enhance oxygen conductivity. In addition, the dielectrically heatable mesh may be used to reduce the startup time of the SOFC, particularly in cold weather.

An alternative example may include, for example, a high temperature molten-carbonate fuel cell (MCFC); wherein a dielectrically heatable mesh is embedded in a potassium carbonate salt electrolyte. The dielectrically heatable mesh may be heated up to a sufficient temperature in order to liquefy the potassium carbonate. A dielectrically heatable mesh may be composed of, for example, silicon carbide. The dielectrically heatable mesh may be used to increase the carbonate ion conductivity, particularly in cold weather. The dielectrically heatable mesh may be used to increase and maintain the operating temperature of an MCFC, preferably in the range of 600 to 700 degrees Celsius. In addition, the dielectrically heatable mesh may be used to reduce the startup time of the MCFC, practically in cold weather.

Example 18: In an example, a dielectrically heatable mesh may be embedded in the ion selective membrane of a flow battery; wherein the flow battery is hybrid flow battery. A hybrid flow battery may include, for example, a lithium hybrid flow battery. A lithium hybrid flow battery may be comprised of a catholyte tank, which is used to store the catholyte, and a flow battery reactor cell. A catholyte may be composed of diethyl carbonate with lithium hexafluorophosphate ($LiPF_6$) as the ionic conducting salt. A flow battery cell reactor may be composed of a porous cathode and a lithium metal anode, which are separated by an ion selective membrane. An ion selective membrane may include, for example, garnet-structure lithium lanthanum zirconium oxide formed onto, or into, a silicon carbide mesh, acting as the dielectrically heatable mesh. An ion conducting solution, such as lithium hydroxide, may be used between lithium lanthanum zirconium oxide and lithium metal as an ion conducting media in order to facilitate lithium conduction on the anolyte side of the flow battery. A dielectrically heatable mesh may be used to increase the lithium-ion conduction through the lithium lanthanum zirconium oxide, particularly in cold weather.

The above-described systems and methods can be ascribed to the dielectric heating of all types of electrolytes in electrochemical systems using dielectrically heatable materials embedded or suspended in the electrolytes, or by heating the electrolytes direct by heating its material components, or by heating the materials in other battery components such as the positive and/or negative electrodes which in turn will heat the electrolyte which is in direct contact with said battery components.

The above describe systems and methods can be ascribed to all types of electrochemical cells including, for example, primary batteries, secondary batteries, electrochemical capacitors, flow batteries, air-batteries, fuel cells, etc.

The above describe systems and methods can be ascribed to electrochemical cells of various sizes ranging from button cell size to large format, including those used in the grid, wherein the large format is further described in the art.

The above described systems and methods can be ascribed for different electrochemical cell configurations, such as coin cells, button cells, cylindrical cells, pouch cells, prismatic cell, or any other types of cells to serve different applications.

The above described system and methods can be ascribed for all liquid, polymer, gel-polymer, molten-salt, solid-state, ceramic-polymer composite, semi-solid-state, or hybrid based electrochemical systems.

The above-described systems and methods can be used in applications including automotive, handheld electronics, grid storage backup, load balancing, medical, wearables, etc.

The above-described systems and methods can be used in cold weather climates including those that are not on or in the vicinity of earth including in space, such as space stations, satellites, both natural and unnatural, and other planetary bodies such as mars.

What is claimed:
1. A dielectric heating method, comprising:
  providing an electrochemical system comprising:
    an anode;
    a cathode; and
    an electrolyte, wherein the electrolyte includes a solid electrolyte, wherein the electrochemical system includes at least one dielectrically heatable material, the at least one dielectrically heatable material having a dielectric loss or loss tangent ($\delta$) value of at least $1\times10^{-5}$ in the frequency range of $10^3$ to $10^{12}$ Hz; and applying an electromagnetic wave in the frequency range of $10^3$ to $10^{12}$ Hz to induce a polarization change in the at least one dielectrically heatable material, thereby heating up the at least one dielectrically heatable material.

2. The dielectric heating method of claim 1, wherein the at least one dielectrically heatable material includes the electrolyte.

3. The dielectric heating method of claim 1, wherein the at least one dielectrically heatable material includes at least one dielectrically heatable layer in contact with the electrolyte.

4. The dielectric heating method of claim 1, wherein the at least one dielectrically heatable material includes a component of at least one of the anode and the cathode.

5. The dielectric heating method of claim 1, wherein the at least one dielectrically heatable material includes a battery separator.

6. The dielectric heating method of claim 1, wherein the electrochemical system further comprises an anode current collector connected to the anode and a cathode current collector connected to the cathode, and wherein the electromagnetic wave is applied to the anode current collector and the cathode current collector.

7. The dielectric heating method of claim 1, wherein the electromagnetic wave is applied at a pulsated rate with controlled intermittent interruptions.

8. The dielectric heating method of claim 1, wherein the electromagnetic wave is applied continuously without interruptions.

9. The dielectric heating method of claim 1, further comprising operating the electrochemical system while the at least one dielectrically heatable material is in the heated state.

10. The dielectric heating method of claim 9, wherein operating the electrochemical system while the plurality of dielectrically heatable materials are in the heated state comprises a flow of ions through the electrolyte.

11. The dielectric heating method of claim 9, wherein operating the electrochemical system while the plurality of dielectrically heatable materials are in the heated state comprises discharging or charging the electrochemical system.

12. The dielectric heating method of claim 1, wherein the electrochemical system further comprises an anode current collector connected to the anode and a cathode current collector connected to the cathode, wherein the electromagnetic wave generator is connected to the at least one of the anode and cathode current collectors through primary terminals of the electrochemical cell.

13. The dielectric heating method of claim 1, wherein the electrochemical system further comprises an anode current collector connected to the anode and a cathode current collector connected to the cathode, wherein the electromagnetic wave generator is connected to the at least one of the anode and cathode current collectors through secondary terminals of the electrochemical cell.

14. The dielectric heating method of claim 1, wherein the at least one dielectrically heatable material has a dielectric loss or loss tangent ($\delta$) value of at least $1\times10^{-4}$ in the frequency range of $10^3$ to $10^{12}$ Hz.

15. The dielectric heating method of claim 1, wherein the at least one dielectrically heatable material has a dielectric loss or loss tangent ($\delta$) value of at least $1\times10^{-3}$ in the frequency range of $10^3$ to $10^{12}$ Hz.

16. The dielectric heating method of claim 1, wherein the electrochemical system is an electric vehicle battery pack comprising two or more electrochemical cells.

17. A dielectric heating method for heating an electric vehicle battery pack comprising two or more electrochemical cells and at least one dielectrically heatable material in the electric vehicle battery pack, the electrochemical cells comprising a solid electrolyte, the at least one dielectrically heatable material having a dielectric loss or loss tangent ($\delta$) value of at least $1\times10^{-5}$ in the frequency range of $10^3$ to $10^{12}$ Hz, the method comprising:

applying an electromagnetic wave in a frequency range of $10^3$ to $10^{12}$ Hz to induce a polarization change in the at least one dielectrically heatable material, thereby heating up the at least one dielectrically heatable material.

18. The dielectric heating method of claim 17, further comprising discharging or charging the electric vehicle battery pack while the at least one dielectrically heatable material is in the heated state.

19. The dielectric heating method of claim 17, wherein the electric vehicle battery pack is discharged or charged through a primary electrical circuit, and wherein the electromagnetic wave is applied to the electric vehicle battery pack through a secondary electrical circuit.

20. The dielectric heating method of claim 1, wherein the at least one dielectrically heatable material comprises at least one wire or fiber embedded in or suspended within the electrolyte.

* * * * *